US010688839B1

(12) United States Patent
Slade et al.

(10) Patent No.: US 10,688,839 B1
(45) Date of Patent: Jun. 23, 2020

(54) NOSE BOX INSERT FOR MONITORING AND FAULT DETECTION IN A TRUCK TRAILER

(71) Applicant: Grote Industries, Inc., Madison, IN (US)

(72) Inventors: Adam Slade, Madison, IN (US); Kevin Cornelius, Lees Summit, MO (US)

(73) Assignee: Grote Industries, Inc., Madison, IN (US)

( * ) Notice: Subject to any disclaimer, the term of this patent is extended or adjusted under 35 U.S.C. 154(b) by 0 days.

(21) Appl. No.: 16/412,876

(22) Filed: May 15, 2019

(51) Int. Cl.
| | | |
|---|---|---|
| *H04W 4/80* | (2018.01) | |
| *H04W 76/10* | (2018.01) | |
| *B60D 1/64* | (2006.01) | |
| *B60R 16/023* | (2006.01) | |
| *B62D 65/16* | (2006.01) | |
| *H04W 76/14* | (2018.01) | |
| *H04L 12/40* | (2006.01) | |

(52) U.S. Cl.
CPC ............ *B60D 1/64* (2013.01); *B60R 16/0231* (2013.01); *B62D 65/16* (2013.01); *H04L 12/40* (2013.01); *H04W 76/14* (2018.02); *H04L 2012/40215* (2013.01); *H04L 2012/40273* (2013.01)

(58) Field of Classification Search
CPC .......... B60D 1/64; H04W 76/14; H04W 4/80; B60R 16/0231; H04L 12/40; H04L 2012/40215; B62D 65/16; H04B 1/202
See application file for complete search history.

(56) References Cited

U.S. PATENT DOCUMENTS

| | | | |
|---|---|---|---|
| 4,846,697 A | 7/1989 | Rodgers | |
| 5,739,592 A * | 4/1998 | Rigsby | ..................... B60D 1/62 280/422 |
| 5,854,517 A | 12/1998 | Hines | |
| 6,558,167 B2 | 5/2003 | Harmon et al. | |
| 6,642,628 B2 | 11/2003 | Burdick et al. | |
| 7,435,093 B1 | 10/2008 | Harmon et al. | |
| 7,491,065 B2 | 2/2009 | Wagner | |
| 8,376,758 B2 * | 2/2013 | Sell | .......................... B60D 1/64 439/34 |
| 9,045,093 B2 | 6/2015 | Dobrow et al. | |
| 9,819,115 B2 | 11/2017 | Markefka | |

(Continued)

OTHER PUBLICATIONS

Smart Box Repair Receptacles the Smart Way with Tramec Sloan's Smart Box; Lit-FS 34, v. 092115.

*Primary Examiner* — Andrew Wendell
(74) *Attorney, Agent, or Firm* — Woodard Emhardt Henry Reeves & Wagner LLP

(57) ABSTRACT

A nose box insert for a truck trailer nose box. The insert may include a baseplate and multiple electrical terminals for connecting a receptacle, such as a standard J-560 nose box receptacle, to wiring in a truck trailer. A control circuit may be included to control and detect and/or report outages of multiple trailer components including, but not limited to, LED lamps, trailer braking systems, environmental sensors, or other components. A communication circuit may be included in the control circuit and may be configured to establish at least one communication link with a remote device to allow the nose box insert to wirelessly report information to a remote device indicating operational aspects such as the location of the trailer, to the status of the individual trailer components, or other relevant information.

48 Claims, 11 Drawing Sheets

(56) References Cited

U.S. PATENT DOCUMENTS

| | | |
|---|---|---|
| 10,027,072 B1 | 7/2018 | Shaeffer et al. |
| 10,388,161 B2 * | 8/2019 | Troutman ............. G07C 5/0825 |
| 2002/0098718 A1 * | 7/2002 | Harmon ................... B60D 1/62 |
| | | 439/35 |
| 2017/0171952 A1 | 6/2017 | Troutman |
| 2018/0059161 A1 * | 3/2018 | Slade ....................... B60Q 1/00 |
| 2018/0099712 A1 * | 4/2018 | Bean ................... H04L 12/4625 |
| 2018/0265001 A1 * | 9/2018 | Bean ................... G01R 19/145 |
| 2019/0268675 A1 * | 8/2019 | Troutman ................ H04Q 9/00 |

* cited by examiner

NOSE BOX INSERT FOR MONITORING AND FAULT DETECTION IN A TRUCK TRAILER

BACKGROUND

Truck trailers continue to become more complex with time as freight hauling companies seek to reduce operating cost, maximize vehicle up time, and gather more data about how their loads are moving around the world. This means the addition of an ever increasing number of sensors and communication equipment to facilitate more monitoring of important trailer functionality.

Government regulations dictate which of the trailer components must be operational while the trailer is in transit on a public highway. For example, the stop, left and right turn signal, tail, license, clearance, side marker, and identification lights must be operating. However, because of the vibration, moisture, and other aspects of the fairly harsh environment trailers generally operate in, lamps may burn out or succumb to shock, vibration or other physical damage, or trailer wiring may corrode or be damaged causing weak or failed electrical connections. All of these can result in the failure of trailer lights, and other important trailer components such as sensors, actuators, and electronic control circuitry. Failures such as these can result in more downtime, lost profits, and in some cases fines imposed by law enforcement if the failures go undetected until they are found in an inspection.

Products and systems exist for alerting operators and maintenance technicians that critical components of a truck tractor or trailer are failing, or have stopped working altogether. However, in some cases, these systems may require an extensive retrofit of the trailer wiring and the installation of expensive sensors and control circuitry to accommodate an ever increasing number of more and more sophisticated trailer components. This also may result in added down town and increased cost and complexity for installers and maintenance crews.

SUMMARY

Disclosed is a nose box insert that is configured to deliver real-time status of components in a tractor trailer such as the various operating lamps required by law. The insert is mountable behind a standard J-560 receptacle or nosebox and may be configured to continuously monitor voltage and current usage of the various lamps, sensors, and other circuits in the trailer. A control circuit in the nosebox insert may be configured or programmed to detect gradual changes in the operation of the trailer, or sudden failures of important components, and wirelessly report this information in real time to a remote system. The nose box insert may be mounted behind an existing J-560 nosebox between the nosebox and the trailer making it less difficult and time consuming to retrofit for existing trailers.

The disclosed nose box insert may be configured to monitor and report the status and detect outages of a wide variety of components in a truck trailer. In one aspect, the nose box insert provides a mount for a trailer nose box having a baseplate defining at least four plate mounting holes corresponding to at least four trailer mounting holes on the trailer nose box, and a circuit housing coupled to the baseplate. The circuit housing may include at least seven nose box terminals extending from the housing, the seven nose box terminals including a ground cable terminal and six separate power cable terminals. The housing may also include at least two trailer terminals extending from the circuit housing, the trailer terminals including a trailer ground terminal and at least one trailer power terminal, and a control circuit within the circuit housing, the control circuit having a communication circuit configured to establish at least one communication link with a remote device. In this example, the control circuit is optionally configured to electrically connect the nose box terminals to the trailer terminals, and to determine the status of one or more trailer components electrically connected to the at least two trailer terminals. The control circuit is optionally configured to use the communication link to send data defining the status of the one or more trailer components.

In another aspect, the seven nose box terminals optionally correspond to the seven connection terminals of a conventional J-560 trailer connection. In another aspect at least two trailer terminals include six separate trailer power cables, and one separate trailer ground cable. The at least one trailer power terminals may include six power terminals corresponding to a J-560 trailer connection.

In another aspect, the nose box mount includes at least one communications terminal configured to electrically connect to a communications bus, wherein the control circuit is configured to receive data and send data to trailer components electrically connected to the communications bus. In another aspect, communication circuit includes at least one antenna and is optionally configured to send data wirelessly to the remote device using the at least one antenna. Multiple antennas may be included for multiple different types of wireless communication links that may be used. The at least one communication link may include at least one of the following or any combination thereof: a Bluetooth wireless communication link that sends the data according to the Bluetooth protocol, a LoRa (Long Range) communication link that sends the data according to the LoRa protocol, a communication link that conforms to the Institute of Electrical and Electronics Engineers (IEEE) 802.15.4 specification, a communication link that conforms to any one or more of the IEEE 802.11 family of wireless protocols, and/or a cellular telephone communication link.

In another aspect, the control circuit may further include a memory, and the control circuit may be configured to record in the memory the status of the one or more trailer components at a first time, and optionally the control circuit is configured to obtain the status from the memory and send the data to the remote device at a second time that is later than the first time.

In another aspect, control circuit may include an energy harvesting control circuit may be configured to obtain data defining the status of an energy harvesting device, and to optionally send data defining changes in the operation of the energy harvesting device.

In another aspect, control circuit may further include a location finding circuit optionally configured to determine a geographic location of the nose box mount on the earth. The location finding circuit may be configured to triangulate the geographic location using signals from at least one transmitter sending signals received by the location finding circuit. The control circuit may be configured to send the geographic location to the remote device using the at least one communication link.

In another aspect the control circuit may include a memory and at least one accelerometer or other motion sensor. The control circuit may optionally be configured to store in the memory accelerometer data received from the accelerometer and it may be configured to send the accelerometer data to the remote device using the at least one communication link.

In another aspect the control circuit may include a trailer component control circuit that is optionally electrically connected to the at least two trailer terminals, the trailer component control circuit being configured to generate trailer component control signals for one or more trailer components. The trailer component control signals may be sent to the at least one power terminal and passed to the trailer components through an electrical connection to the at least one power terminal.

In another aspect, the control circuit may include a Control Area Network (CAN) control circuit having a CAN transceiver, the CAN control circuit may be electrically connected to one or more CAN terminals adapted to connect to at least one CAN communications cable. The CAN control circuit may be configured to generate the trailer component control signals for the one or more trailer components using the CAN transceiver.

In another aspect, an environmental monitoring circuit responsive to one or more environmental sensors, may be included. The control circuit is optionally configured to obtain environmental data from the environmental monitoring circuit and to send the environmental data to the remote device optionally using the at least one communication link.

In another aspect control circuit may include an outage detection circuit responsive to one or more trailer components. The control circuit is optionally configured to determine an outage that occurs when the one or more trailer components has failed, and may send data about the one or more trailer components to the remote device using the at least one communication link. In another aspect, the outage detection circuit may be configured to monitor changes in voltage between at least two of the trailer terminals to determine an outage. In another aspect, the outage detection circuit may be configured to monitor an electrical current passing through at least one trailer power terminal to determine an outage.

In another aspect the at least one communication circuit may include any one or more of: an RS-232 compatible port, an Ethernet compatible port, or a Universal Serial Bus (USB) compatible port.

In another aspect the baseplate optionally defines a central opening adapted to receive at least two wires electrically connected to the at least two trailer terminals. In another aspect, at least two of the four trailer mounting holes are about 4.4 inches apart, or 4.375 inches apart in this example, and at least two other of the four trailer mounting holes are about 3.8 inches apart, such as 3.75 inches apart as shown. Here, the terms "about" in reference to measurements of hole spacing generally means the holes are spaced to be interchangeable with an existing mounting structure in the trailer, some of which may, for example, be 4.375 inches apart, 3.75 inches apart, a little more, or a little less. Precise measurements are meaningful insofar as they provide one example of the spacing.

In another example, a nose box assembly for a truck trailer may include a receptacle having six separate power terminals and one ground terminal, wherein the external power cable and ground connection terminals may be arranged in the receptacle to conform to a standard J-560 trailer connection. The nose box may define front and rear openings, and the receptacle may be coupled to the nose box at the front opening. The front opening may define a generally six-sided peripheral shape. The nose box assembly may optionally include a baseplate defining multiple plate mounting holes, and the baseplate may be mounted at the rear opening of the nose box. A circuit housing may be coupled to the baseplate, the circuit housing optionally including a receptacle ground terminal electrically connected to the ground terminal of the receptacle, and six separate power cable terminals electrically connected to the power terminals of the receptacle. At least two trailer terminals may extend from the circuit housing, and the trailer terminals may include a trailer ground terminal and at least one trailer power terminal. A control circuit may be positioned adjacent the circuit housing and may have a communication circuit configured to establish at least one communication link with a remote device. The control circuit may be configured to electrically connect the receptacle terminals to the trailer terminals, determine the status of one or more trailer components electrically connected to the at least two trailer terminals, use the communication link to send data defining the status of the one or more trailer components. The plate may be mounted to the rear opening of the nose box, and the circuit housing may be mounted to the baseplate enclosing the circuit within the nose box. The rear side of the enclosure and the baseplate may be mounted to the truck trailer by multiple fasteners passing through multiple mounting holes defined by the baseplate and the nose box, and into the trailer.

In another aspect, the communication circuit further may include at least one antenna, and the communication circuit may be configured to send data wirelessly to the remote device using the at least one antenna.

In another aspect the at least one communication link may include at least one of the following or any combination thereof: a Bluetooth wireless communication link that is configured to send the data according to the Bluetooth protocol, a LoRa communication link that sends the data according to the LoRa protocol, a communication link that conforms to the Institute of Electrical and Electronics Engineers (IEEE) 802.15.4 specification, a communication link that conforms to any one or more of the IEEE 802.11 family of wireless protocols, and/or a cellular telephone communication link. The at least one communication link may optionally include at least one of the following or any combination thereof: an RS-232 compatible port, an Ethernet compatible port, or a Universal Serial Bus (USB) compatible port.

In another aspect the control circuit may include a location finding circuit configured to determine a geographic location of the location finding circuit on the earth, wherein the location finding circuit is configured to triangulate the geographic location using signals from at least one transmitter sending signals received by the location finding circuit. The control circuit may be configured to send the geographic location to the remote device using the at least one communication link.

In another aspect, control circuit may include a memory at least one accelerometer, and the control circuit may be configured to store in the memory accelerometer data received from the accelerometer, and optionally send the accelerometer data to the remote device using the at least one communication link.

In another aspect the control circuit the control circuit may include a trailer component control circuit that is electrically connected to the at least two trailer terminals, the trailer component control circuit may be configured to generate trailer component control signals for one or more trailer components. The trailer component control signals may be carried by an at least one power cable electrically connected to the at least one power terminal.

In another aspect, at least one trailer power terminal may include six trailer power terminals, and the trailer components mounted to the truck trailer may include any combination of: a running lamp, interior illumination lamp, clearance lamp, backup lamp, license plate lamp, stop lamp, tail lamp, turn lamp, stop-tail-turn lamp, Anti-lock Braking controller, brake pressure sensor, cargo area temperature sensor, door sensor, cargo sensor, humidity sensor, tank level sensor, proximity sensor, tire pressure sensor, refrigeration system temperature sensor, refrigeration system controller, backup camera, or side camera.

In another aspect trailer component the control circuit further may include a Control Area Network (CAN) control circuit having a CAN transceiver, the CAN control circuit electrically connected to CAN terminals adapted to connect to at least one CAN communications cable. The CAN control circuit may be configured to generate the trailer component control signals for the one or more trailer components using the CAN transceiver. In another aspect, the CAN communication cables may be electrically connected to CAN component control circuits for the trailer components. In this example the trailer components are mounted to the truck trailer and may include any combination of: a running lamp, interior illumination lamp, clearance lamp, backup lamp, license plate lamp, stop lamp, tail lamp, turn lamp, stop-tail-turn lamp, Anti-lock Braking controller, brake pressure sensor, cargo area temperature sensor, door sensor, cargo sensor, humidity sensor, tank level sensor, proximity sensor, tire pressure sensor, refrigeration system temperature sensor, refrigeration system controller, backup camera, or side camera.

In another aspect, the control circuit optionally includes an environmental monitoring circuit responsive to one or more environmental sensors that may be configured to obtain environmental data from the environmental monitoring circuit and send the environmental data to the remote device using the at least one communication link.

In another aspect at least one trailer power terminal includes six separate trailer power cables electrically connected to six separate power cables in the truck trailer, the six separate power cables electrically optionally connected to multiple trailer components in the truck trailer.

In another aspect the control circuit further comprises an outage detection circuit responsive to one or more trailer components, wherein the control circuit may be configured to determine an outage that occurs when the one or more trailer components has failed, and to send data about the one or more trailer components to the remote device using the at least one communication link. The outage detection circuit may be configured to monitor changes in voltage between at least two of the trailer terminals to determine an outage and may also optionally be configured to monitor an electrical current passing through at least one trailer power terminal to determine an outage.

In another aspect the cross section of the housing defines a six-sided polygon. Also disclosed are aspects of a method of installing a nose box assembly on a truck trailer. Actions that may be taken include electrically connecting at least one trailer power cable of the truck trailer to at least one trailer power terminal of a nose box mount, and at least one trailer ground cable of the truck trailer to at least one trailer ground terminal of the nose box mount. In this example, the nose box mount may include a receptacle ground terminal and at least six separate receptacle power terminals, and a control circuit that may have communication circuit configured to establish at least one communication link with a remote device. The control circuit is configured to optionally electrically connect the receptacle terminals to the trailer terminals, determine the status of one or more trailer components electrically connected to the at least two trailer terminals, and/or use the communication link to send data defining the status of the one or more trailer components.

Other actions that may be taken include electrically connecting the receptacle ground terminal and the at least six separate receptacle power terminals to corresponding ground and power terminals of a receptacle of the nose box assembly. The receptacle ground and power terminals may be arranged in the receptacle mount to conform to a standard J-560 trailer connection.

The method may also include positioning the nose box mount between the truck trailer and the nose box assembly, and fastening the nose box mount and the nose box assembly to the truck trailer.

Also disclosed are examples of a control circuit assembly adapted to be placed between a truck trailer and a nosebox, the nosebox optionally including an outward facing receptacle to interface with a standard J-560 trailer connection plug and inward facing terminals, and the nosebox further defining an inward facing footprint. In this example, the control circuit may include a base member, an optional first seal locatable between the base member and the trailer to substantially seal against moisture passage therebetween, and an optional second seal locatable between the base member and the nosebox to substantially seal against moisture passage therebetween. The control circuit may be attached to the base member and may include a plurality of leads electrically connectable to at least some of the inward terminals of the receptacle to also connect to at least a power and a ground wire of the truck trailer.

In another aspect, the plurality of leads has seven separate leads connectable to seven separate terminals of the receptacle.

In another aspect, the base member may define a peripheral shape corresponding to and larger than the inward facing footprint of the nosebox. In another aspect, the base member may define a peripheral shape selected from the group consisting of: (a) generally six-sided, (b) generally circular, (c) generally rectangular, and (d) generally isosceles trapezoidal on at least half of the peripheral shape. In another aspect, the base member may define four mounting holes therein to receive four fasteners therethrough for fastening to the trailer. In another aspect, control circuit assembly may further include two outwardly facing fasteners for fastening the base member to the nose box.

In another aspect, the first seal may include a gasket defining a central opening and four holes therearound and corresponding in location to the four mounting holes in the base member. In another aspect, at least two of the four mounting holes of the baseplate are about 4.4 inches apart, and at least two of the four mounting holes are about 3.8 inches apart. In another aspect, the two outwardly facing fasteners are positioned 4 inches apart. In another aspect the baseplate and the control circuit are formed as a single unitary molded structure.

In another aspect, control circuit may include a communication circuit configured to establish at least one communication link with a remote device, the control circuit may be configured to determine the status of one or more trailer components electrically connected to at least two of the multiple leads, and the control circuit may be configured to use the communication link to send data defining the status of the one or more trailer components.

In another aspect, the communication circuit includes at least one antenna, and the communication circuit is optionally configured to send data wirelessly to the remote device using the at least one antenna. The at least one communication link may include at least one of the following or any combination thereof: a Bluetooth wireless communication link that sends the data according to the Bluetooth protocol, a LoRa communication link that sends the data according to the LoRa protocol, a communication link that conforms to the Institute of Electrical and Electronics Engineers (IEEE) 802.15.4 specification, a communication link that conforms to any one or more of the IEEE 802.11 family of wireless protocols, and/or a cellular telephone communication link.

Further forms, objects, features, aspects, benefits, advantages, and examples of the disclosed concepts will become apparent from the detailed description and drawings provided herewith.

DETAILED DESCRIPTION

Figure 1:
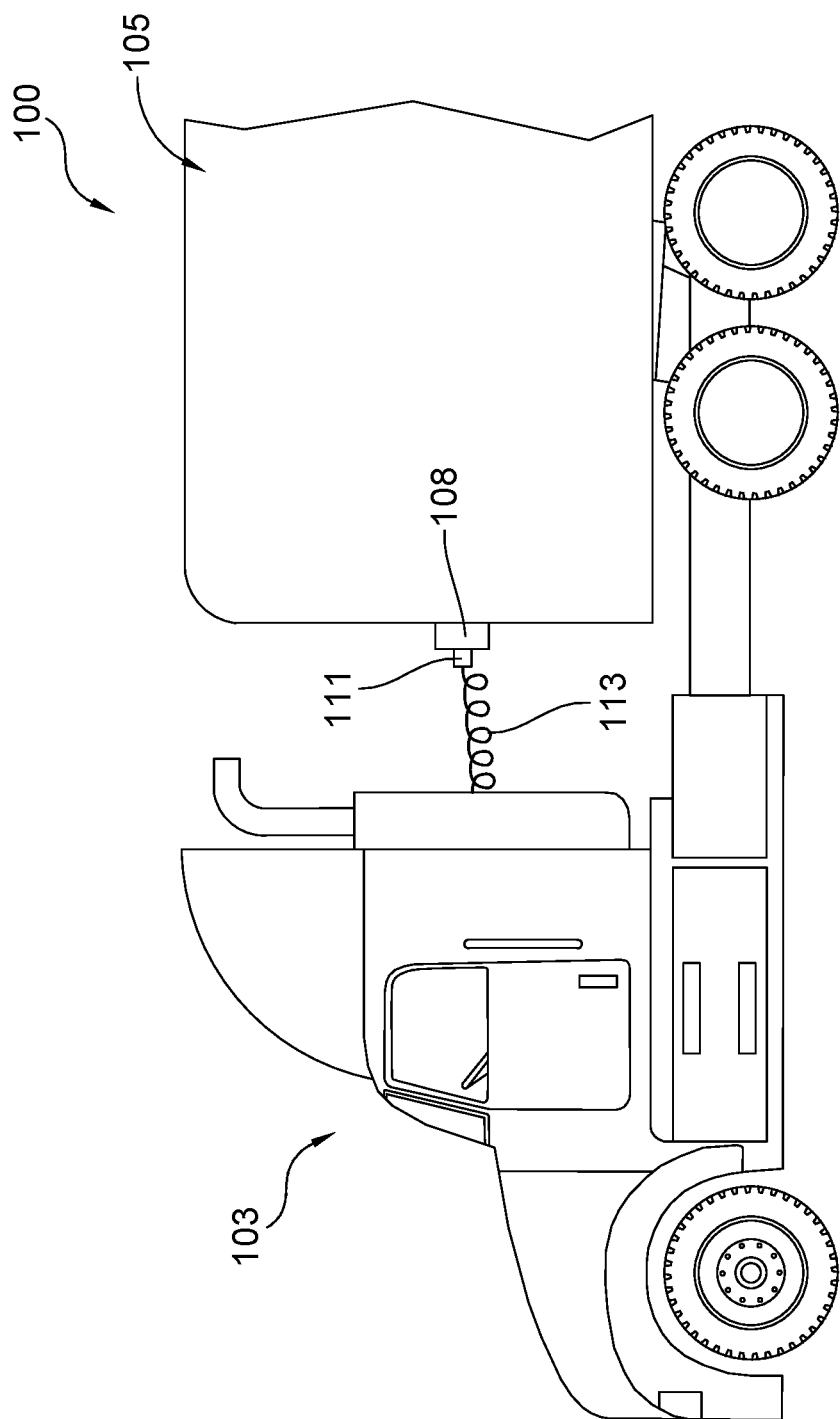
FIG. 1 is a diagram illustrating one example of the disclosed nose box assembly mounted to a truck trailer.

FIG. 1 illustrates at 100 one example of the disclosed insert mounted to a trailer 105 as part of nose box assembly 108. A power plug 111 may be inserted into nose box assembly 108 to carry power from power cables 113. Power cables 113 may be electrically connected to truck 103 using a similar power plug and nose box. Thus power, data signals, and the like may be carried from computers, actuators, user controls, and the like in truck 103 to trailer 105 via power cables 113.

Figure 2:
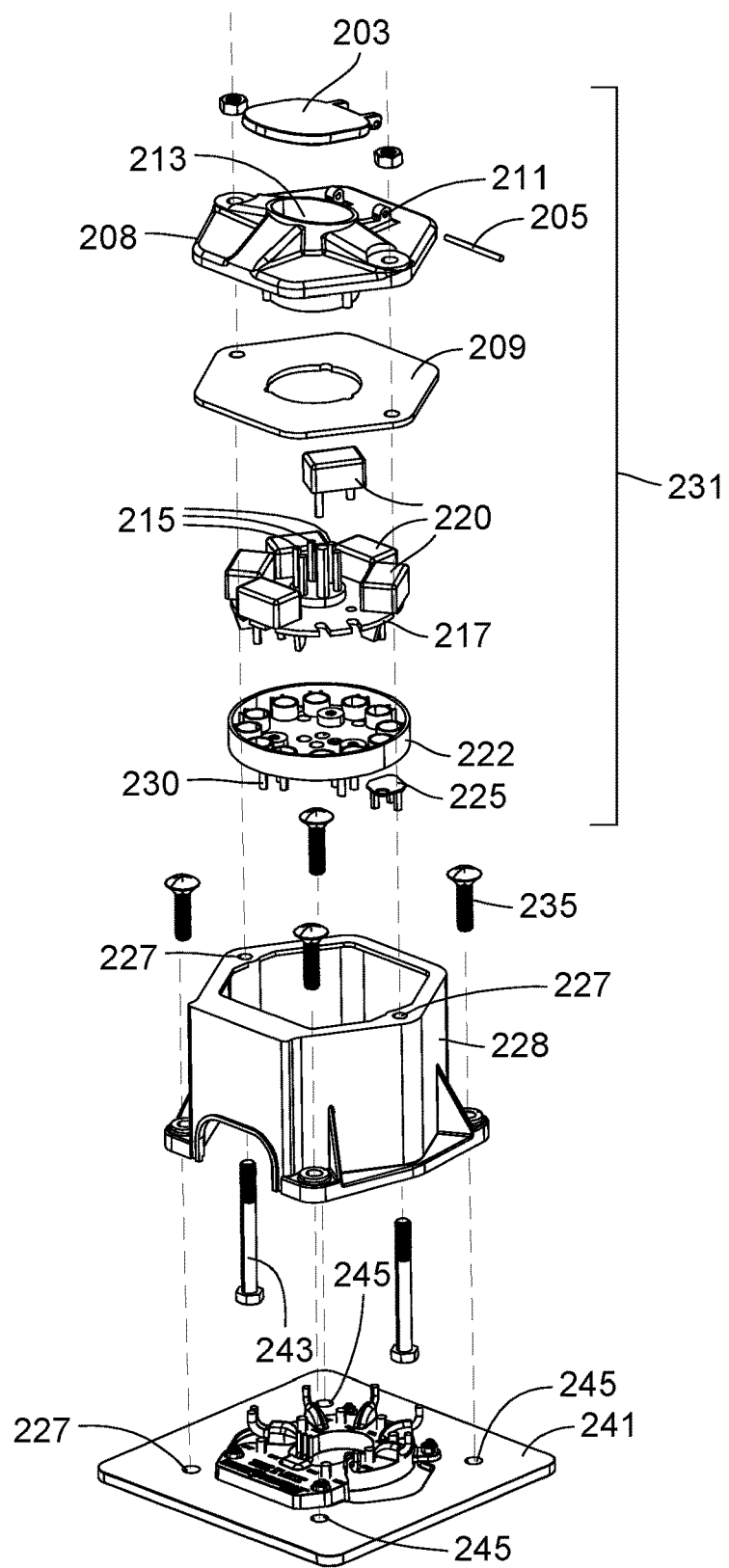
FIG. 2 is an exploded view of the nose box assembly of FIG. 1.

FIG. 2 illustrates one example of a nose box assembly 108. In this example, nose box assembly 108 includes a terminal cover 203 mounted to a receptacle cover 208 which may also be referred to herein as a nose box cover as it encloses the front or forward portion of nose box assembly 108. A terminal cover mount 211 defines multiple holes for receiving a pin 205 which also passes through corresponding holes defined by terminal cover 203. Thus terminal cover 203 is arranged and configured to be selectively openable to enclose the front portion of a terminal opening 213 defined by receptacle cover 208. Terminal opening 213 and/or terminal cover 203 may also include a sealing member such as a gasket adjacent terminal opening 213 for partially or hermetically sealing the terminal opening 213 to keep out debris or foreign objects.

Receptacle cover 208 may be mounted to housing or nose box 228 using a fastener such as fastener 243 passing through holes 227 defined by housing 228. Fasteners 243 may also pass through seal 209, and receptacle cover 208. Seal 209 may thus be positioned between housing 228 and a receptacle cover 208 to partially or hermetically seal housing 228 from moisture and other foreign material. Receptacle cover 228 in this example defines a terminal opening 213 that extends through the corresponding terminal opening in seal 209 such that external power cable connection terminals 215 may then protrude into terminal opening 213. This allows an external power cable connector to be inserted into terminal opening 213 to engage cable connection terminals 215 thus electrically connecting the external power cables to cable connection terminals 215.

Power cable connection terminals 215 may be mounted to a component mounting plate 217 and may include any suitable number of connection terminals. Component mounting plate 217 may also be referred to as a terminal mount 217 configured to mount multiple forward facing terminals for electrically connecting to power cables inserted into terminal opening 213. For example, external power cable connection terminals 215 may include six separate power terminals, and one ground terminal configured and arranged to conform to the J560 standard for trailer power connections.

Electronic components 220 may be mounted to component mounting plate 217. Electronic components 220 may include components such as circuit breakers, switching devices, fuses, and the like. Multiple components 220 may be included as illustrated, and may be separately electrically connected to the external power cable connection terminals 215. For example, electronic components 220 may include individual circuit breakers electrically connected in series with each individual connection terminal 215 to provide overcurrent protection for each separate power circuit or branch electrically connected to each pin.

Electronic components 220 mounted to component mounting plate 217 may be positioned and retained in place within nose box assembly 108 by a component plate 222. Electrical connections between components 220 on the component mounting plate and connection pins 215 may be made by circuitry on component mounting plate 217.

Pins of the electronic components 220 may pass through component mounting plate 217, and component plate 222 to engage and electrically connect to one or more mount components 225. Mount components may include studs 230 projecting rearward from the backside, or bottom side of component plate 222. Studs 230 may also be referred to as inward facing terminals of the receptacle 231 because they extend into nose box 228 from receptacle 231. These studs of connector mount components 225 optionally provide one or more separate electrical connection points for electrically connecting cables or wires to each of the separate individual external power cable connection terminals.

Thus in this example, electronic components 220, component mounting plate 217, component plate 222, and connector mount components 225 may be all positionable within housing 228 and enclosed by receptacle cover 208. These components may be referred to as one example of nose box assembly for mounting to a truck trailer. In another aspect, terminal cover 203, receptacle cover 208, electronic components 220, component mounting plate 217, component plate 222, and connector mount components 225 (and their respective related aspects) may be collectively referred to as a receptacle 231 for a trailer power connector or power plug. Thus the nose box assembly shown in FIG. 2 may also be referred to as a combination of a receptacle 231, a nose box 228, and a mount 241. Mount 241 is mountable to a truck trailer by any suitable means such as by multiple fasteners 235. Any suitable fasteners may be used such as bolts 243 projecting through holes 245 and into a mounting structure in trailer 105.

Figure 3:
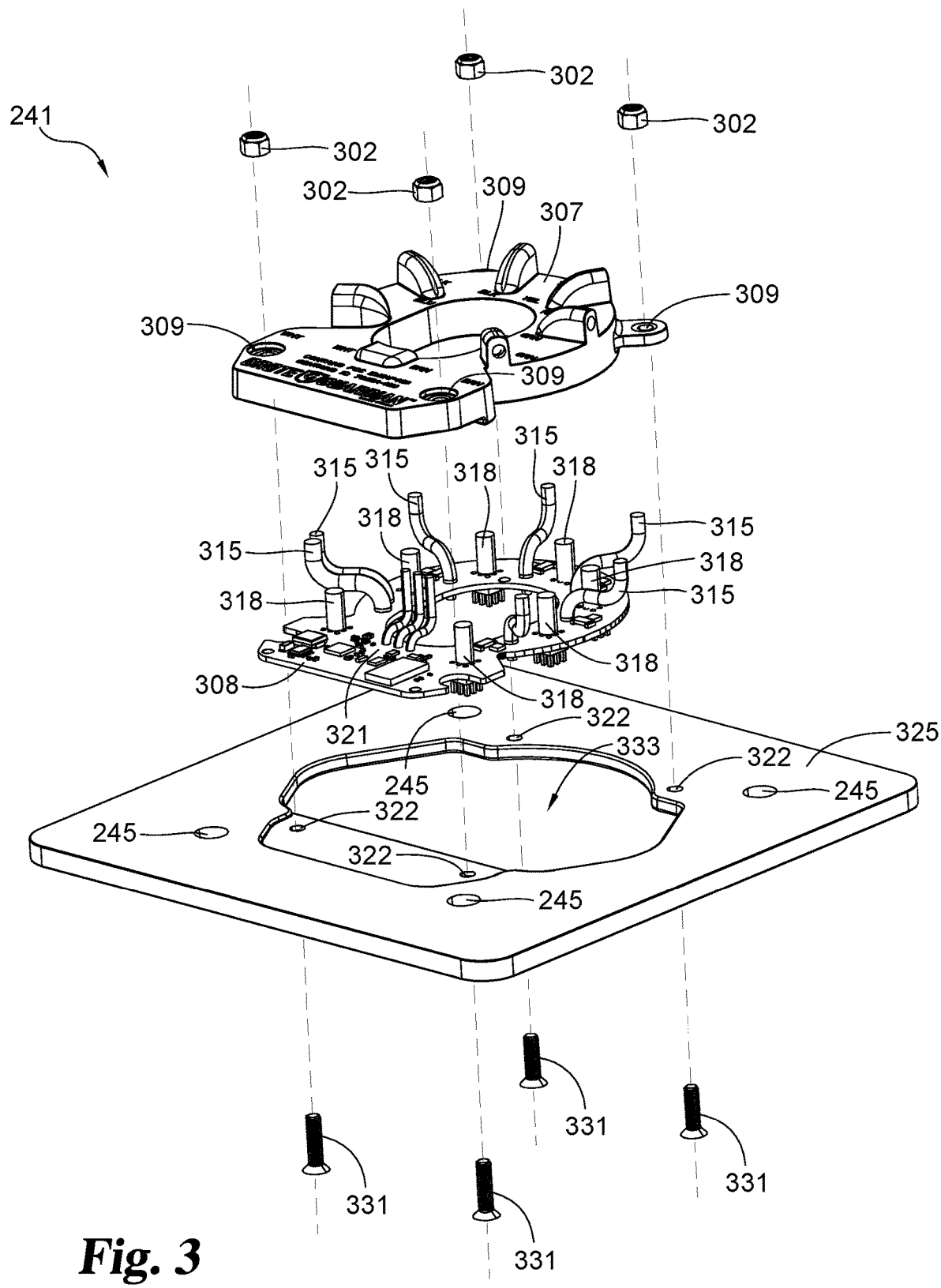
FIG. 3 is an exploded view of the baseplate assembly of FIGS. 1 and 2.

Additional aspects of one example of mount 241 are illustrated in FIG. 3. Mount 241, in this example, may include a baseplate or base member 325, control circuit 308, and a control circuit housing 307. Housing 307 may optionally be a separate component attachable to control circuit 308 and baseplate 325 via one or more fasteners such as bolts 331. These fasteners may pass through holes 322 defined in baseplate 325 and holes 309 in housing 307 and may be retained in place by retention members such as nuts 302. In another example, housing 307, control circuit 308, and baseplate 325 may be formed, fused together, or adhered together to form a single unitary molded structure using plastics, or other suitable materials. Baseplate 325 may define an opening 333 through which wires from trailer 105 may pass when mount 241 is in position.

Control circuit 308 may further include multiple nose box terminals or receptacle terminals 315 for electrically connecting forward facing terminals adjacent the front of the nose box to control circuit 308. Multiple trailer terminals 318 are also mounted to and/or electrically connected to control circuit 308. For example, nose box terminals 315 may be electrically connected to connection terminals 215 of the receptacle. To make this electrical connection, terminals 315 may be physically connected to a connector mount component 225 by physically coupling leads to corresponding studs 230. Seven nose box terminals 315 and seven trailer terminals 318 are shown, however any suitable number of terminals may be included in control circuit 308. In another example, control circuit 308 includes seven nose box terminals 315, and two trailer terminals 318. In yet another example, control circuit 308 includes seven nose box terminals 315, and four trailer terminals 318. Additional communication terminals 321 may be included for electrically connecting control circuit 308 to another piece of communication equipment, or a communication bus.

Figure 4:
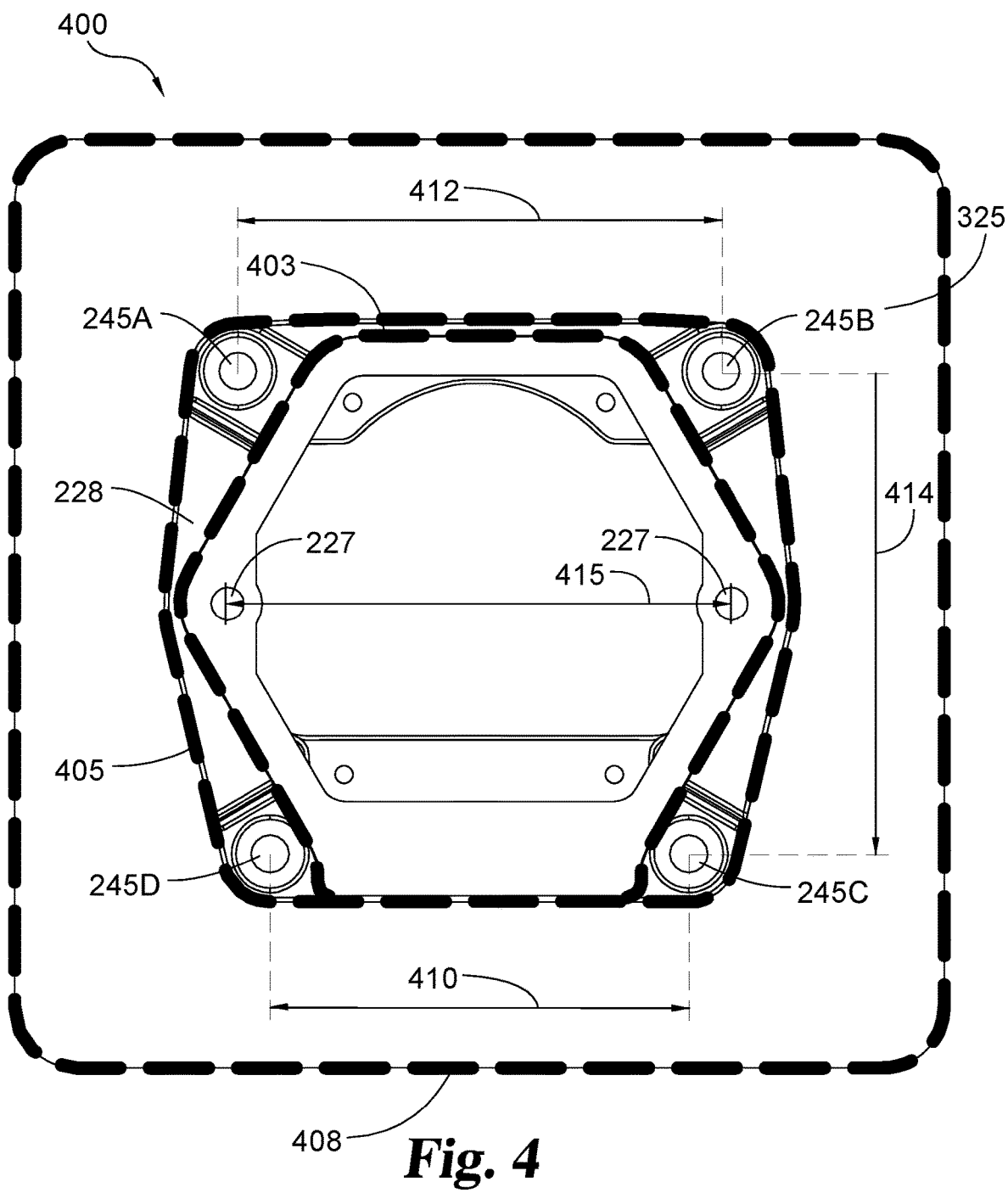
FIG. 4 is a front view of the nose box of FIGS. 2 and 3 illustrating aspects of the peripheral shape of the nose box assembly.
Figure 5:
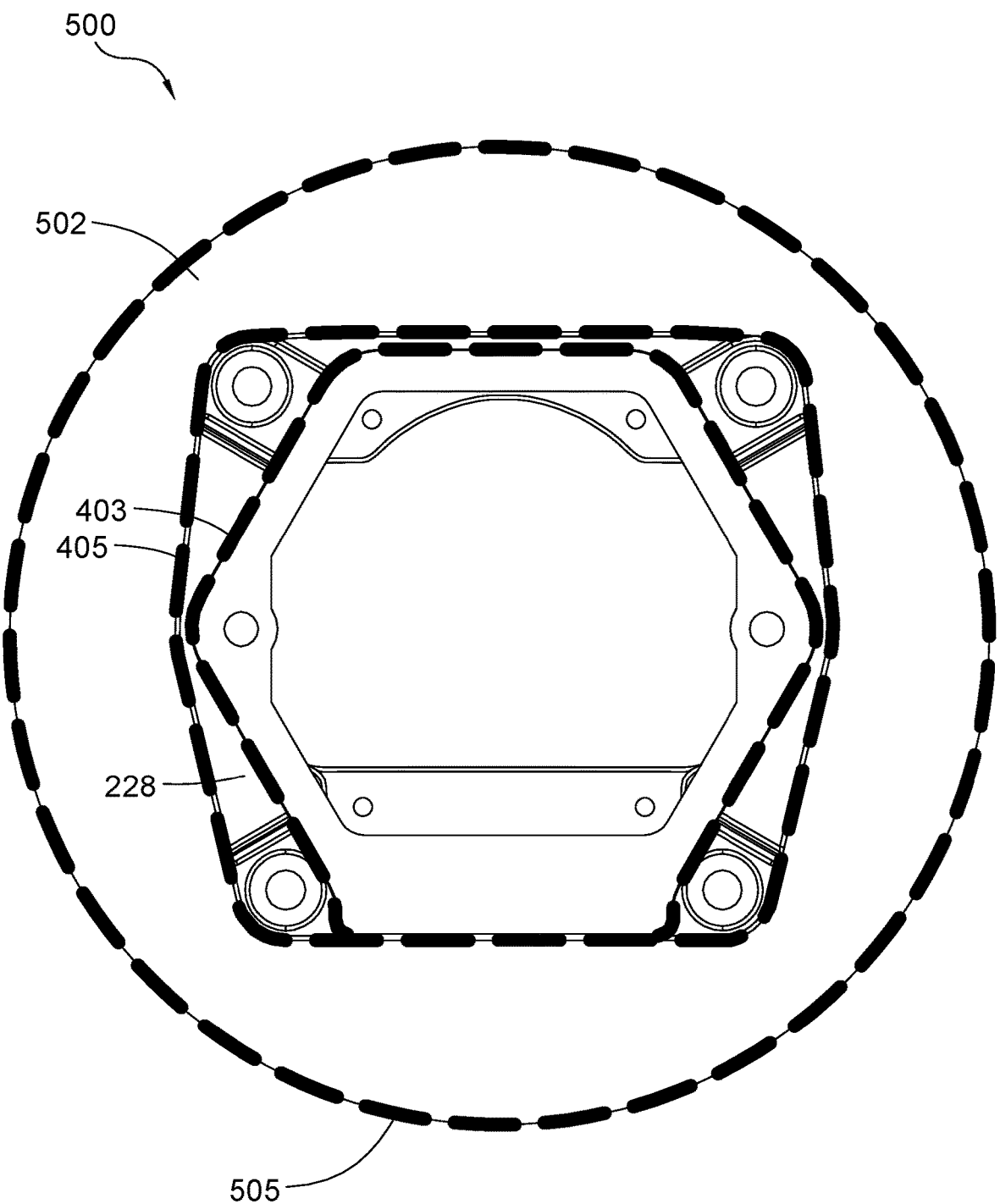
FIG. 5 is a front view of another example of the nose box of FIGS. 2 and 3 illustrating other possible peripheral shapes of the nose box assembly.
Figure 6:
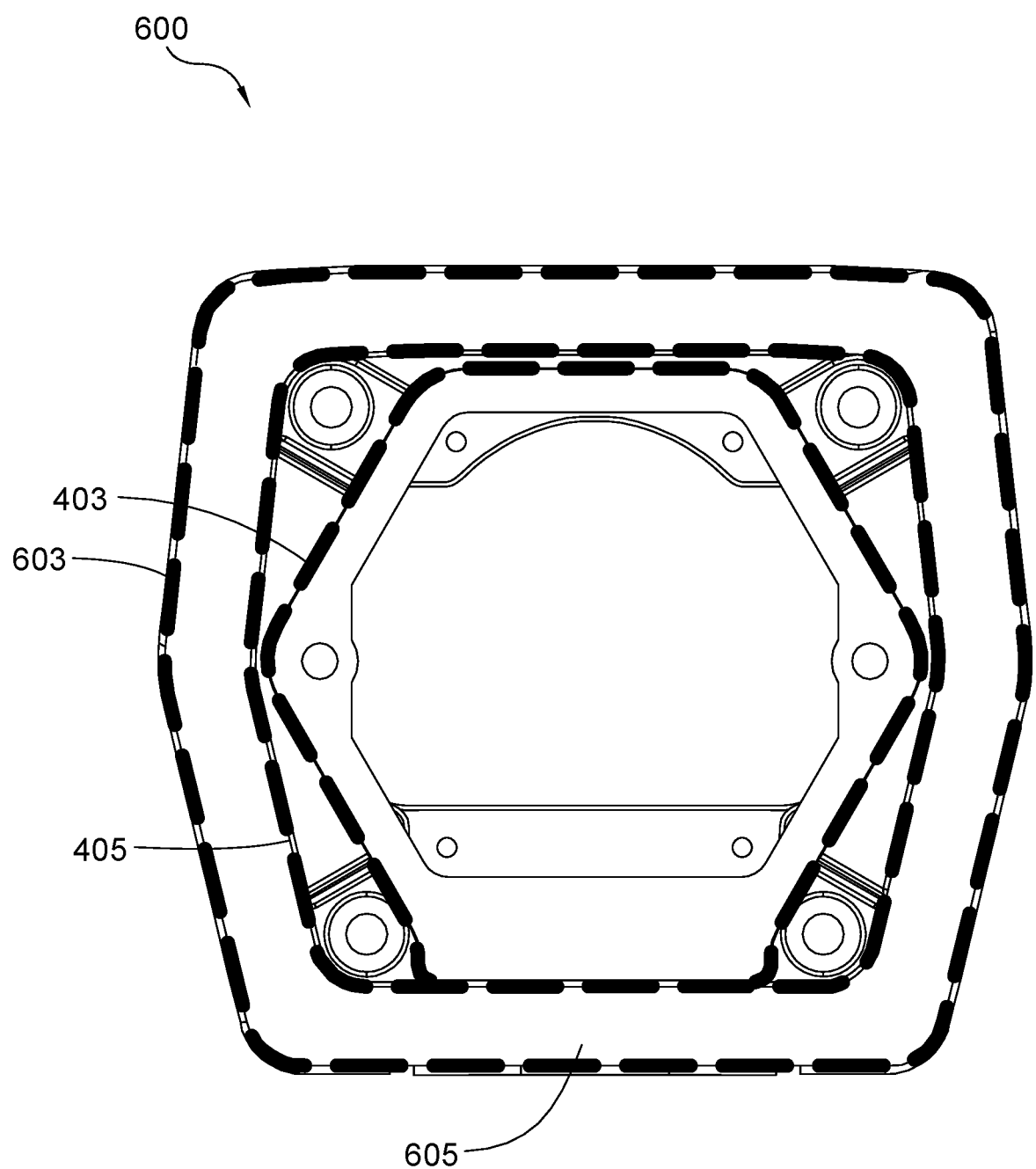
FIG. 6 is a front view of yet another example of the nose box of FIGS. 2 and 3 illustrating other possible peripheral shapes of the nose box assembly.

Aspects of the geometry of nose box assembly 108 are further illustrated in FIGS. 4, 5, and 6. These figures illustrate that any suitable nose box geometry may be used, preferably geometries that define a shape that corresponds to openings defined by the mounting structure of the truck trailer such that nose box assembly 108 may be easily positioned and mounted. In FIG. 4 at 400 is a baseplate 325 viewed from the front of nose box 228 looking towards the rear of the nose box (i.e. toward the trailer). In this example, the peripheral shape 408 of baseplate 325 defines a trailer facing footprint for the nose box assembly that is generally rectangular and is larger than the peripheral shape 405 of the rear portion of nose box 228. The peripheral shape 408 is generally rectangular with rounded corners, although any suitable corner shape may be used.

Peripheral shape 408 for the baseplate may be optionally larger than peripheral shape 405 of the rear of the nose box so that a seal may be located between the baseplate 325 and the trailer to seal against moisture passage therebetween. Another second seal may be also located between the nose box and the base member 325 to substantially seal against moisture passage therebetween as well. These seals may be separable gaskets optionally including materials impermeable to liquids, gases, or solid particles to reduce or eliminate the introduction of any foreign material inside nose box 228. In another example, the first and second seals may be formed as part of base member 325.

In FIG. 4, the rear portion of nose box 228 generally defines an isosceles trapezoidal polygon on at least half of the peripheral shape. Specifically, in this example, peripheral shape 405 may be thought of as including two isosceles trapezoids joined together to form an inward or trailer facing footprint for nose box 228. The rear portion of nose box 228 may also be referred to as defining a generally six sided polygon with a six sided rear footprint.

FIG. 4 also illustrates a specific geometry of mount holes 245. Holes 245A and 245B are positioned a predetermined distance 412 apart, and holes 245D and 245C are positioned predetermined distance 410 apart which is less than distance 412. In a specific example, distance 412 is 4.375 inches were as distance 410 is 3.75 inches. Holes 245B and 245C are also a predetermined distance 414 apart. In one specific example, distance 414 is 4.375 inches. In another aspect, predetermined distance 414 is also the distance between holes 245A and 245D. In another aspect, holes 245 are positioned at four of the six vertices of the six-sided rear facing footprint 405. The distances between holes 245 are provided here as illustrations and are not restrictive in any sense. Any suitable pattern or number of holes 245 such as five holes, six holes, three holes, and the like, may be advantageous. The specific examples as to distances between the holes are also illustrative and not restrictive as any suitable distance, pattern, footprint, or arrangement of holes may be used. The spacing of trailer mounting holes may be about 4, or about 4.4 inches apart, or as shown here, 4.375 inches apart in this example. Other trailer mounting holes may be about 3 inches apart, or about 3.8 inches apart, such as 3.75 inches apart as shown. As noted above, the terms "about" in reference to measurements of hole spacing generally means the holes are spaced to be interchangeable with an existing mounting structure in the trailer. Thus, the term "about" as used here may refer to a variance of 10% from the given value, or may also generally refer to hole arrangements that allow for one component (such as the nose box or the baseplate) to be interchangeable with another component that may already be mounted to the trailer and may be removed and replaced. The precise measurements in the examples provided are exemplary rather than restrictive.

FIG. 4 also illustrates one example of the spacing between holes 227 defined in housing 228. In the illustrated example, holes 227 are a predetermined distance 415 apart. Any suitable distance may be used corresponding to mounting holes in receptacle 231. In one specific example, predetermined distance 415 is 4 inches, however distance 415 may be less than 4 inches, or greater than 4 inches depending on the overall size of the front facing footprint 403. In another aspect, holes 227 are generally located at two vertices of the hexagonal front facing footprint 403.

In another aspect, the front portion of nose box 228 generally defines a generally six sided perimeter shape 405 that in this example is generally hexagonal having six sides approximately the same length. This generally six sided perimeter shape 405 thus defines a front facing nose box footprint. Thus in this example, nose box 228 has a six sided rear footprint and a six sided front footprint, where the two footprints have differing shapes.

In FIG. 5 at 500, another example baseplate 502 is shown that is like baseplate 325, but has a peripheral shape 505 defining a trailer facing footprint for the nose box assembly that is generally circular or round and is larger than the peripheral shape 405 of the rear portion of nose box 228. In this example, peripheral shape 505 defines a trailer facing footprint for the nose box assembly that is generally around and is larger than the peripheral shape 405 of the rear portion of nose box 228.

In FIG. 6 at 600 is shown another example baseplate 605 that defines a rear facing or trailer facing perimeter shape 603 corresponding to and larger than the inward facing or rear footprint of the nosebox 405, and the outward facing or front footprint 403. In this example, baseplate 605 has generally defines an isosceles trapezoidal polygon on at least half of the peripheral shape 603. Specifically, in this example, peripheral shape 603 is like peripheral shape 405 in that it is defined by two isosceles trapezoids joined together to form an inward or trailer facing footprint for nose box 228.

Figure 7:
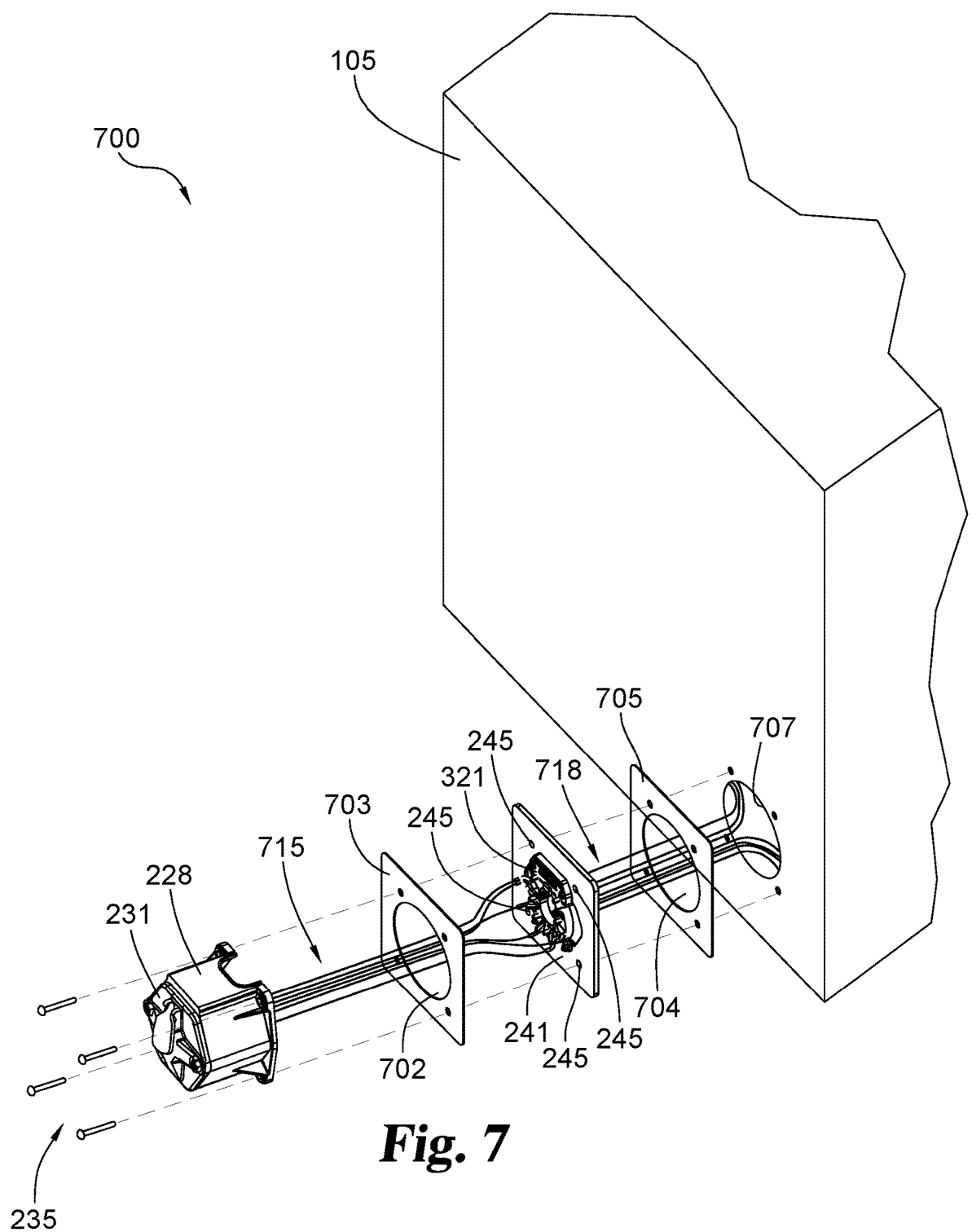
FIG. 7 illustrates additional aspects of mounting the nose box assembly of FIGS. 1-6 to a truck trailer.

Illustrated in FIG. 7 at 700 is one example of a nose box assembly mounted to a trailer 105. A baseplate (also referred to as a mount or a base member) 241 may be positioned with a first seal 705 between baseplate 241 and trailer 105. This first seal is thus optionally locatable between the base member and the trailer to substantially seal against moisture passage therebetween. First seal 705 optionally defines an opening 704 through which at least one trailer power cable or trailer leads 718 may pass. Trailer power cables 718 are electrically connectable to trailer terminals 318 of baseplate 241. Trailer power cables 718 may optionally pass through an opening 707 defined by trailer 105 to reach base member 241.

A second seal 703 may be positioned between baseplate 241 and nose box 228. The second seal is thus optionally locatable between the base member 241 and the nosebox 228 to substantially seal against moisture passage therebetween. Second seal 703 optionally defines an opening 702 through which multiple nose box power cables or nosebox leads 715 may pass. Nose box power cables 715 may electrically connect nose box terminals 315 to inward or rear facing terminals 230 of receptacle 231.

A control circuit 308 may optionally be attached to the base member 241 or in another example, may optionally be formed with baseplate 241 as a single unitary structure. As illustrated here and elsewhere in other figures, multiple leads 315 and 318 are electrically connectable to at least some of the inward facing terminals of the receptacle 231 and are also connectable to at least a power and a ground wire of the truck trailer.

In another aspect, base member 241 defines four mounting holes therein to receive four fasteners 235 therethrough for fastening to the trailer 105. First seal 705 may optionally comprise a gasket defining a central opening 704 and four holes therearound corresponding in location to the four mounting holes 245 in the base member. Similarly, second seal 703 may optionally comprise a gasket defining a central opening 702 and four holes therearound corresponding in location to the four mounting holes 245 in the base member.

FIG. 7 also illustrates aspects of installing or retrofitting a nose box assembly on a truck trailer. In general, actions that may be taken include placing nose box mount 241 over a hole 707 defined by a portion of trailer 105. In this example, trailer cables 718 extend from hole 707, the cables include at least one trailer power cable, and at least one trailer ground cable. Any suitable number of cables may be included in trailer cables 718 such as 2 or more, 4 or more, or 7 or more. Installation may further include electrically connecting at least one trailer power cable of the truck trailer cables 718 to at least one trailer power terminal 315 of the nose box mount 241, and at least one trailer ground cable of the truck trailer cables 718 to at least one trailer ground terminal 315 of the nose box mount 241.

Installation my include electrically connecting the receptacle ground terminal and the at least six separate receptacle power terminals 315 to corresponding ground and power terminals of a receptacle 231 of the nose box assembly. In this example, the receptacle ground and power terminals are arranged in receptacle 231 to conform to a standard J-560 trailer connection. Other actions that may be taken include positioning the nose box mount 241 between the truck trailer 105 and the nose box assembly 108, and fastening the nose box mounted and the nose box assembly to the truck trailer using fasteners 235 passing through corresponding holes in the nose box assembly.

Figure 8:
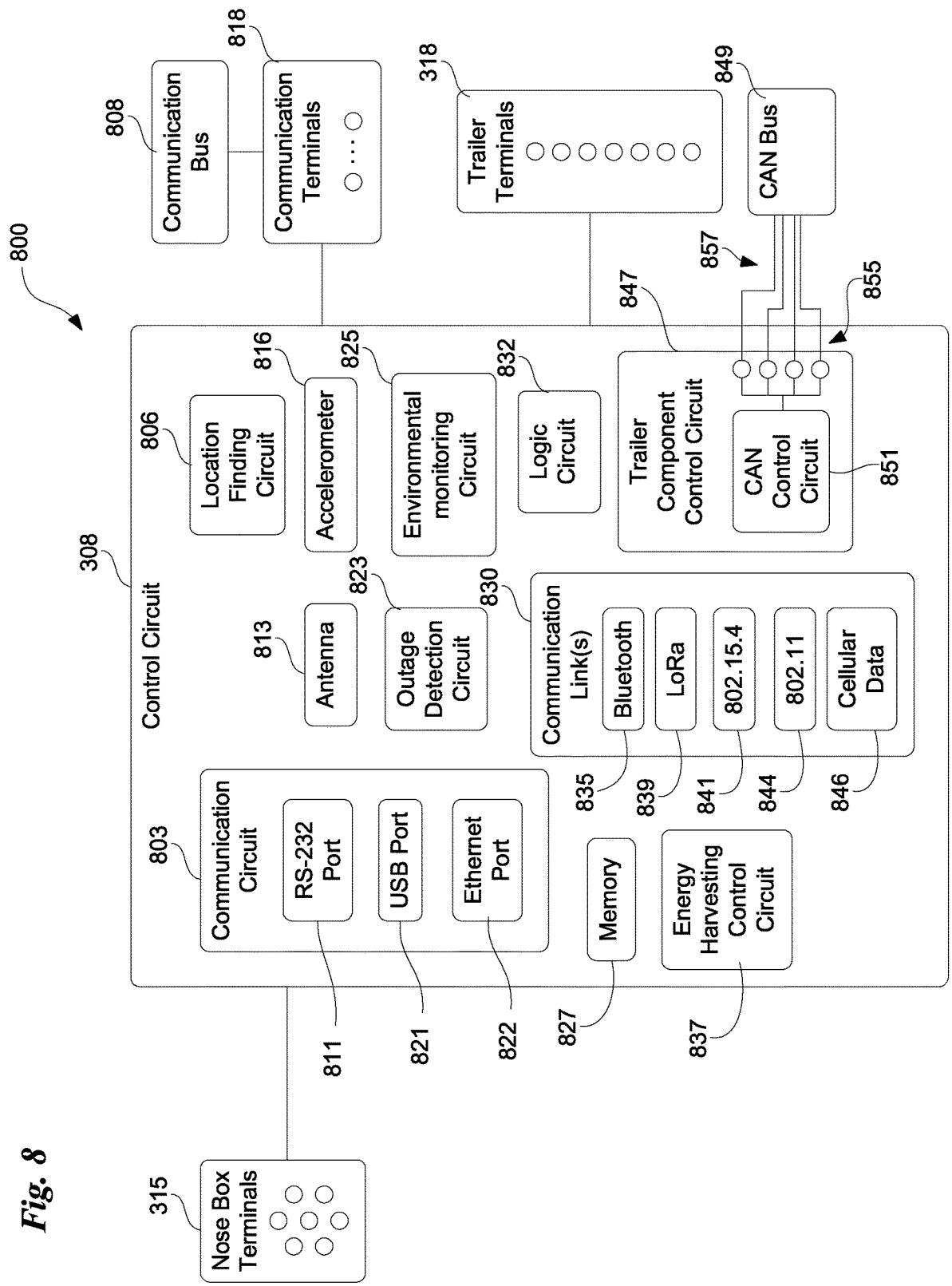
FIG. 8 is a component diagram illustrating aspects of the control circuit in the nose box assembly of FIGS. 1-8.

FIG. 8 illustrates at 800 additional aspects of control circuit 308 which may be included in nose box assembly 108. Control circuit 308 is configured to electrically connect the nose box terminals to the trailer terminals. This electrical connection may be automatically performed by a logic circuit 832 which may include a processor, or other logic circuitry to selectively control power received from the receptacle terminals 315 and distribute it to components of a trailer electrically connected to trailer terminals 318.

Control circuit 308 optionally includes a communication circuit 803 configured to establish and/or maintain at least one communication link 830 with a remote device. The communications link may include a Bluetooth wireless communication link 835 that is configured to send data according to the Bluetooth protocol, a LoRa communication link 839 that sends data according to the LoRa protocol, and/or a communication link 841 that conforms to the Institute of Electrical and Electronics Engineers (IEEE) 802.15.4 specification for Low-Rate Wireless Personal Area Networks (LR-WPANs) such as Zigbee, WirelessHART, MiWi, and SNAP. Communication circuit 803 may include a communication link 844 that conforms to any one or more of the IEEE 802.11 family of wireless WiFi protocols, or a cellular telephone communication link 846, or any combination thereof. The communication circuit 803 optionally includes any one or more of: an RS-232 compatible port 811, an Ethernet compatible port 822, or a Universal Serial Bus (USB) compatible port 821. Wireless communication may be facilitated by an antenna 813 configured to using electromagnetic energy to send and receive data or other information to and from a remote device. Data may be sent using antenna 813 via any suitable medium such as via radio waves, by light transmission, and the like.

Control circuit 308 optionally includes at least one communications terminal 818 configured to electrically connect to a communications bus 808. The control circuit may be configured to receive data from, and send data to, trailer components in trailer 105 that are electrically connected to the communications bus. Communications bus 818 may be implemented using any suitable arrangement of serial or parallel bus technology.

In another aspect, control circuit 803 may include a memory 827, and the control circuit may be configured to store data in memory 827 that includes the status of the one or more trailer components. For example, control circuit 308 may save to the memory the status of one or more trailer components at a first time and obtain the status from the memory and send the data to the remote device at a second time that is later than the first time. Thus the memory 827 may be used as a buffer or short-term storage to store data. This may be advantageous when the control circuit and corresponding nose box assembly are out of range of a remote device.

In another aspect, at least one accelerometer 816 may be included in control circuit 308, and the control circuit is optionally configured to store in memory 827 accelerometer data received from the accelerometer 816. Control circuit 308 may be optionally configured to send the accelerometer data to the remote device using the at least one communication link.

Control circuit 803 may include an energy harvesting control circuit 837 configured to obtain data defining the status of an energy harvesting device in trailer 105 or truck 103, and to send data defining changes in the operation of the energy harvesting device to the remote device.

Control circuit 803 may include a location finding circuit 806 configured to determine a geographic location of the nose box mount on the earth. This location finding circuit may be configured to triangulate the geographic location using signals from at least one transmitter sending signals received by the location finding circuit 806. The control circuit is optionally configured to send the geographic location to the remote device using the at least one communication link 830.

In another aspect control circuit 803 may include a trailer component control circuit 847 that is electrically connected to the at least two trailer terminals 318. Trailer component control circuit 847 may be configured to generate control signals specific to one or more trailer components, or groups of components. These trailer component control signals may be sent to trailer components via at least one trailer power terminal electrically connected to the individual trailer components. In another aspect, trailer component control circuit 847 may include a Control Area Network (CAN) control circuit having a CAN transceiver and other related circuitry. The CAN control circuit 851 is optionally electrically connected to as many as four CAN terminals 855 adapted to connect to corresponding CAN communications cables 857. In another aspect, CAN terminals 855 may be limited to two signaling terminals with power and ground connections provided by a power and a ground terminal of trailer terminals 318. CAN communication cables 857 may be electrically connected to a CAN bus 849 in trailer 105. Individual trailer components may include trailer component control circuitry also electrically connected to CAN bus 849 thus allowing control circuit 803 to send individualized messages to single trailer components, or multiple groups of trailer components activating, deactivating, or determining the status of those components and reporting that information to control circuit 308 via CAN control circuit 851. CAN control circuit 851 may generate and send the trailer component control signals for the one or more trailer components using the CAN transceiver, the control circuit 851 may receive return messaging signals from the individual or multiple trailer components using the CAN bus 849 and CAN transceiver in the can control circuit 851.

In another aspect, control circuit further 803 may include an environmental monitoring circuit responsive to one or more environmental sensors. The control circuit 803 may be configured to obtain environmental data from the environmental monitoring circuit and send the environmental data to the remote device. Control circuit 803 is optionally configured to send the environmental data to the remote device using the at least one communication link 830.

Control circuit 308 may also include an outage detection circuit 823 responsive to one or more of the trailer components in trailer 105. Outage detection circuit 823 is optionally configured to access the status data received from the one or more trailer components and use this information to determine whether an outage for a particular trailer component, or group of components, has occurred.

When a trailer component or group of components has failed, outage detection circuit 823 is configured to send data about the outage, which may include information about the individual one or more trailer components that failed, to the remote device using a communication link 830. In another aspect, outage detection circuit 823 is optionally configured to monitor changes in voltage between at least two of the trailer terminals to determine an outage. For example, outage detection circuit 823 may monitor changes in voltage in one or more of the trailer power cables 718 with respect to a trailer ground cable. Increases, or decreases in voltage may indicate that a particular trailer component has failed. In another aspect, outage detection circuit 823 is optionally configured to monitor the electrical current passing through at least one trailer power terminals to determine an outage for one or more trailer components. Outage detection circuit 823 may monitor changes in current caused by failures of trailer components coupled to different ones of the trailer power cables 718. Trailer components may also be configured to send regular status update messages to control circuit 308 which may be accessed by or acted upon by outage detection circuit 823 to detect component outages and send that outage information to a remote device for further analysis and remedial action.

Figure 9:
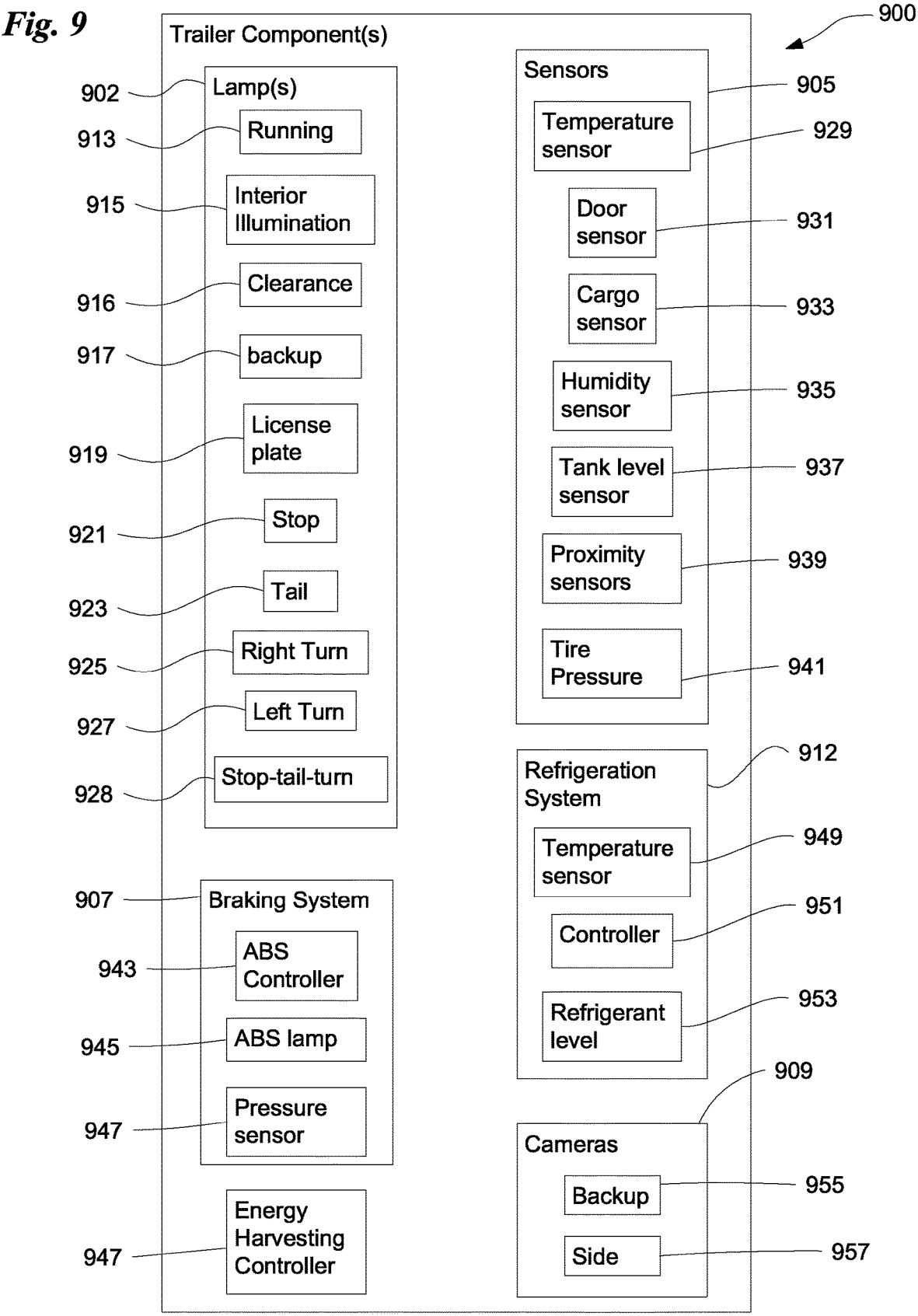
FIG. 9 is a component diagram illustrating examples of trailer components that may interact with the control circuit of FIG. 8.

Examples of trailer components that may be included in a trailer 105 are shown in FIG. 9 at 900. FIG. 9 is provided for illustration and is not meant as an exhaustive or exclusive list of trailer components that may be included in trailer 105. Trailer components may include lamps 902, braking system components 907, sensors 905, cameras 909, and/or a refrigeration system 912. Some of these aspects may be not be included in some trailers, while others trailer components may be included that are not listed. For example, lamps 902 may include, but are not limited to, running lamps 913, interior illumination lamps 915 for lighting the interior of the trailer, side marking/clearance/identification lamps 916 for marking extremities of the trailer, backup lamps 917 for illuminating an area behind the trailer, license plate lamps 919 for lighting license plates and other identifying indicia mounted on the trailer, stop or brake lamps 921 that may illuminate when the vehicle is actively braking, tail lamps 923, left and right turn signal lamps 927 and 925 respectively, and alternatively, combination stop-tail-turn lamps 928.

Sensors 905 may include any of temperature sensors 929 for sensing the temperature in and/or around trailer 105, door sensor 931 configured to optionally sense when trailer doors are open or closed, cargo sensor 933 configured to optionally sense weight, location, and/or other attributes of cargo in (or on) trailer 105, humidity sensor 935 for optionally sensing absolute or relative humidity in and/or around trailer 105, a tank level sensor 937 optionally for sensing the level of fluids (liquids or gases) carried by trailer 105, proximity sensors 939 optionally for sensing proximity of trailer 105 relative to nearby objects, and/or tire pressure sensors 941 optionally for sensing pressure levels in the tires of trailer 105.

Braking system trailer components 907 may optionally include an ABS controller 943 for controlling the ABS braking system, an ABS lamp 945 optionally for indicating the status or failure of the braking system 907, and/or a pressure sensor 947 optionally included to sense changes in hydraulic or air pressure in braking system 907. Other optional trailer components include cameras 909 such as one or more backup cameras 955 for optionally capturing a view of the surrounding area directly behind the trailer 105, and one or more side cameras 957 for optionally capturing a view of areas adjacent the sides of trailer 105.

Components of a refrigeration system 912 may include a temperature sensor 949 for determining the temperature inside a refrigerated cargo area of the trailer, a controller 951 configure to control the refrigeration cycle in the refrigeration system, and a refrigerant level sensor 953 for determining the level of refrigerant in the system 912. Other trailer components may be included in trailer 105 such as an energy harvesting controller 947 configured to control energy harvesting systems that may be present in trailer 105. Such energy harvesting systems may include multiple devices configured to convert sunlight into energy such as photovoltaic cells mounted to different areas of trailer 105, or regenerative braking systems configured to convert momentum of trailer 105 to electrical energy that may be stored in an energy storage system and, for example, used by trailer 105 or truck 103. Other types of energy harvesting equipment may be included in trailer 105 as well and coupled to energy harvesting controller 947.

Figure 10:
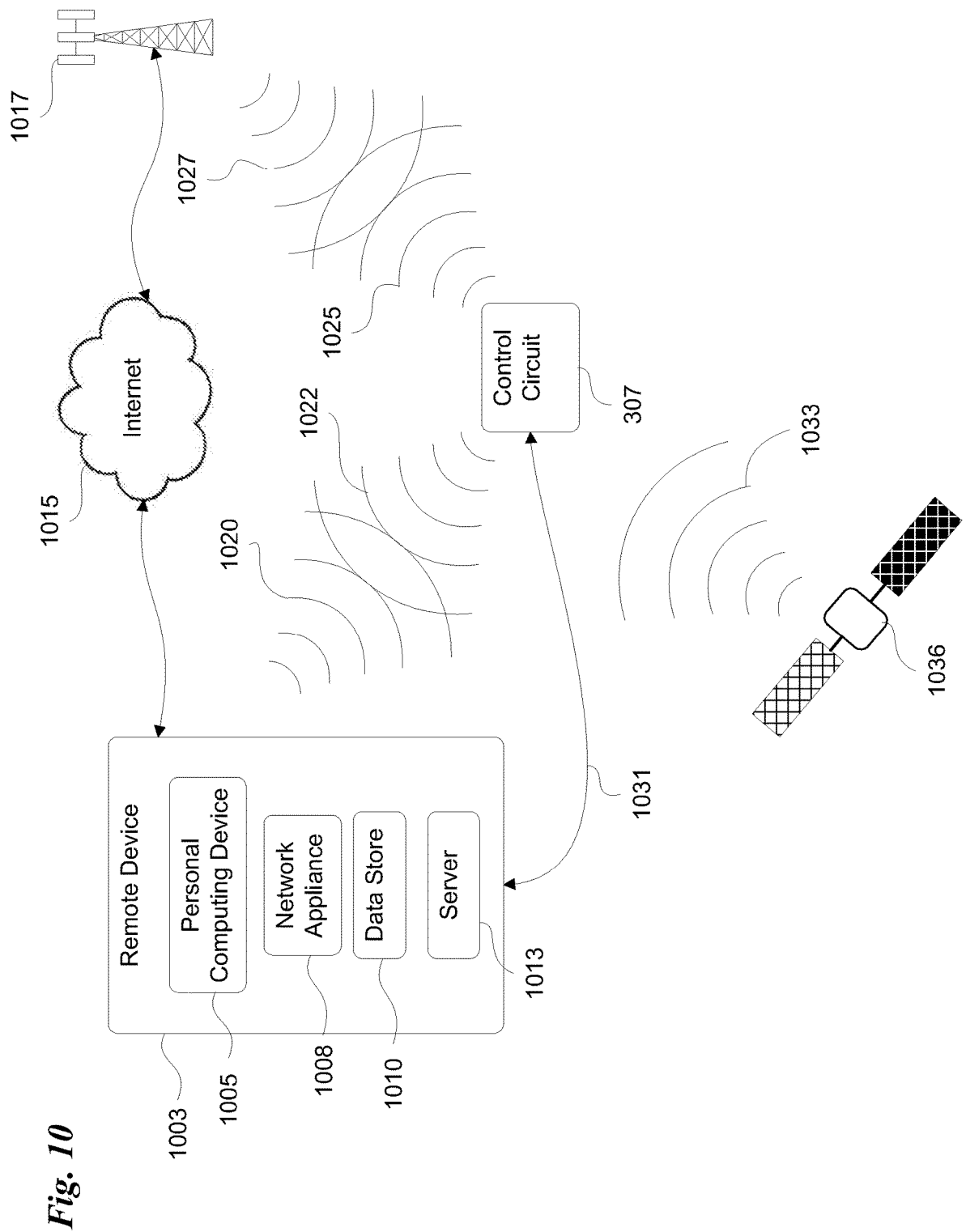
FIG. 10 illustrates communication and location finding aspects of the control circuit of FIG. 8.

The communications circuit 803 may include or use an antenna such as antenna 813 to send data wirelessly to a remote device using the antenna. Aspects of the wireless communications the control circuit may be configured to perform are shown in FIG. 10 at 1000. Control circuit 308 may establish and maintain multiple communication links 830 which may include, for example the communications link 846 configured to send and receive data using a cellular network 1017. Signals 1025 sent to the cellular network, and signals 1027 received from the cellular network may define the data being passed to a remote device 1003. As discussed herein elsewhere, this data may include status information about components of trailer 105, information about the status of a truck 103 and is various components and subassemblies, or operational information about control circuit 308 and its various subcomponents. These are offered as merely examples as any suitable data may be passed by control circuit 308 over a cellular data communications link 846.

This data may then be passed to the remote device 103 via a network 1015 such as the Internet. In this example, data may be passed to the remote device 1003 from the control circuit as the trailer 105 passes through different cells in the cellular network, such as while moving along an interstate highway over a long distance. As the vehicle moves from cell to cell, the data connection to remote device 1003 may be continuously maintained by the cellular network. In this way, control circuit 308 may provide periodic status updates for some or all trailer components. Control circuit 308 may also provide real time updates of the status of a truck 103, trailer 105, and other aspects such as the load being carried in the trailer, and the like.

Control circuit 308 may also communicate wirelessly with a remote device 1003 using other communication links of varying ranges and capabilities. In this example, remote device 1003 may include various communication capabilities that correspond to those discussed with respect to control circuit 308. Remote device 1003 may include any device capable of communication with control circuit 308, examples of which include personal computing devices 1005 such as tablets, smart phones, laptop computers, desktop computers, and the like. Other examples include, but are not limited to network appliances 1008 such as switches, hubs, routers, firewalls, or other similar devices. A data store 1010 is another example of a remote device 1005, examples of which include database servers, or other data storage devices that may interact with control circuit 308 to obtain operational and status information about trailer 105. In another nonlimiting example, server computer 1013 may interact with control circuit 308 to process status information received, and optionally to send updates to interested parties such as by email or text message. Server 1013 may also update a data store such as data store 1010 to save the information provided by the control circuit 308 for additional analysis.

In another example, remote device 1003 may include Bluetooth, LoRa, WiFi (802.11), or other wireless communication capabilities for maintaining corresponding wireless communication links with control circuit 308. Thus as control circuit 308 and remote device 1003 move closer together, the distance between them is reduced to the point that other communications links may be established and maintained by control circuit 308. For example signals 1020 may be sent from remote device 1003 and signals 1022 may be sent from control circuit 308 to implement any suitable shorter range wireless protocol that may be used instead of, or in conjunction with, the cellular communication link with cell network 1017.

For example, as trailer 105 comes within a range of about 5 miles from remote device 1003, communication link 839 of control circuit 308 may automatically establish a LoRa communications link and control circuit 308 may begin communicating status or other information to remote device 1003 according to the LoRaWAN or other similar network protocol. Control circuit 308 may successfully establish communication link 839 using LoRa at any suitable range from remote device 1003 such as a range of less than 10 miles, less than 5 miles, or less than 2 miles. Ranges above 10 miles may be possible as well depending on conditions and the capabilities of the antennas, transmitters, and receivers used by control circuit 308 and remote device 1003. In this example, a LoRA communication link may be automatically established as trailer 105 moves into the same general area as a warehouse, distribution facility, factory, or remote monitoring station to name a few examples. Communication link 839 may also be used simultaneously with other communication links.

In another example, as trailer 105 comes within a range of about 300 feet from remote device 1003, communication link 844 of control circuit 308 may automatically establish a WiFi communications link to allow control circuit 308 two begin communicating information to remote device 1003 according to any suitable network protocol such as TCP/IP and the like. Control circuit 308 may successfully establish communication link 844 using WiFi at any suitable range from remote device 1003 such as at a range of less than 500 feet, less than 300 feet, or less than 50 feet. Ranges greater than 500 feet may be possible as well depending on conditions and the capabilities of the antennas, transmitters, and receivers used by control circuit 308 and remote device 1003. In this example, a Wi-Fi communication link may be automatically established as trailer 105 moves close to a warehouse, distribution facility, factory, or remote monitoring station to name a few examples. In another example, remote device 1003 may be moved close to trailer 105 such as in the case of a person carrying a laptop, smart phone, or other Wi-Fi enabled device that may be configured to communicate with control circuit 308 as the remote device is moved adjacent, into, or around trailer 105. Any suitable communication link may be used including a Bluetooth communication link 835 for closer ranges (e.g. less than 100 feet) communication with control circuit 308, or any communication link 841 that conforms to the IEEE 802.15.4 standard for Wireless Personal Area Networks (WPAN) examples of which include Zigbee, WirelessHART, 6LoW-PAN, and the like.

A physical communication link 1031 may be used to transfer data from control circuit 308 to remote device 1003. Examples of such a link 1031 include wired communications using RS-232 port 811, USB port 821, or Ethernet port 822. In these examples, ports 811, 821, and 822, may be physically accessible on trailer 105 such as ports included in nose box 228. This configuration allows a physical wired connection to be made between the ports and the remote device 1003 facilitating a high-speed, high bandwidth data exchange between control circuit 308 and remote device 1003. Although limited in range, a physical connection 1031 may be advantageous as the wires in the physical connection may be shielded to increase network security and avoid any nearby electromagnetic interference which may reduce or eliminate the opportunity for a wireless communication link.

Control circuit 308 may include a location finding circuit 806 which may be configured to determine the location of control circuit 308, and by association trailer 105. For example, the location finding circuit may use any suitable technology to determine a location for the control circuit 308. For example, location finding circuit 806 may include antennas and processing circuitry for interacting with satellites which are part of the Global Positioning System (GPS). In this example a GPS satellite 1036 may send signals 1033 received by control circuit 308 and used by the location finding circuit 806 to triangulate a geophysical location for trailer 105 on the earth.

In another example, location finding circuit 806 may use electromagnetic signals 1025 and 1027 sent to and from towers of cellular network 1017 to triangulate an approximate location for trailer 105. Location finding circuit 806 may use timing, signal strength, or other suitable information about signals 1025 and/or 1027 to determine the location of control circuit 308. Location finding circuit 806 may determine the location of control circuit 308 using information associated with the IP address assigned to the control circuit 308 such as the MAC address of the control circuit network interface or Wi-Fi signal strength information and the like.

Figure 11:
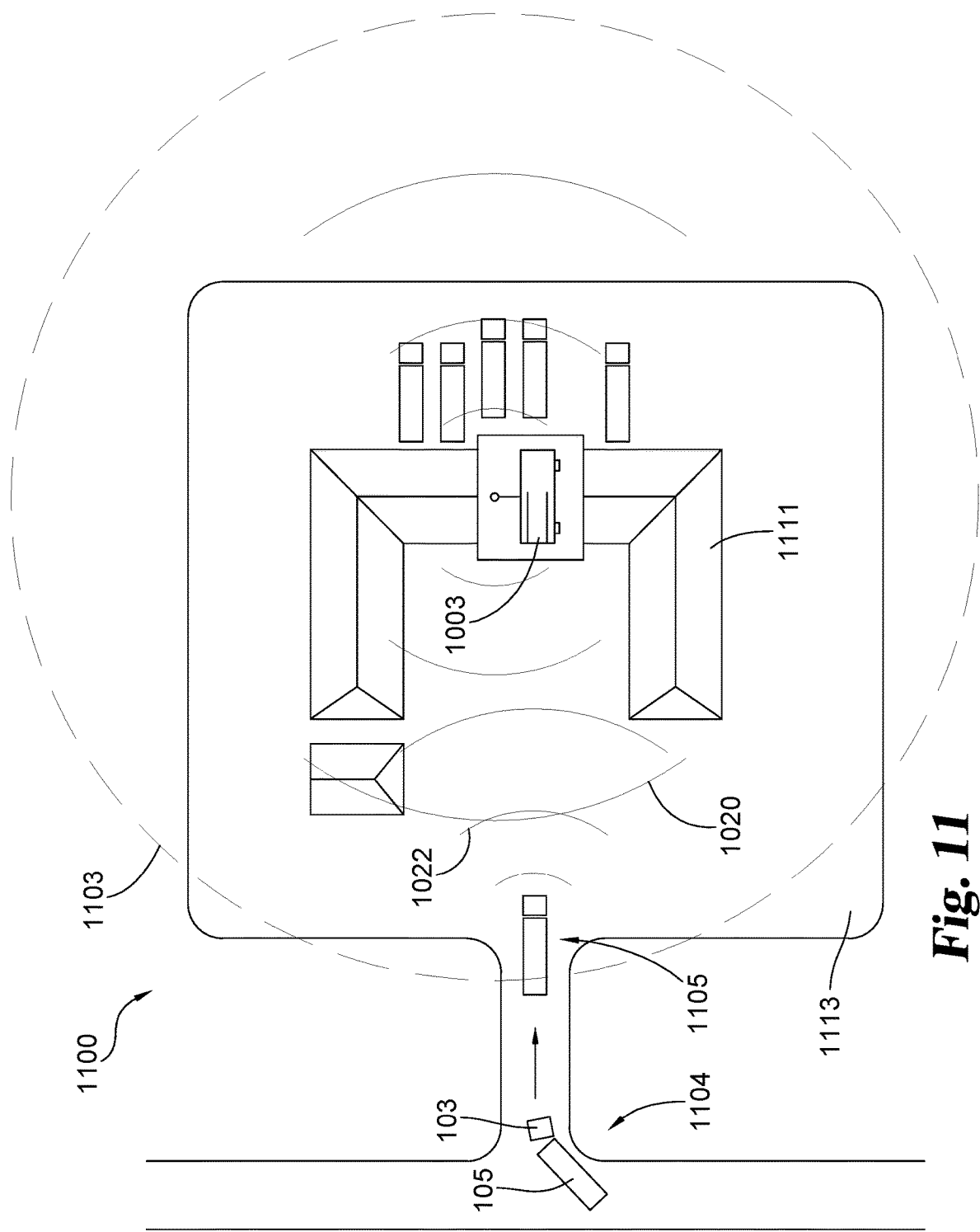
FIG. 11 illustrates additional aspects of the location finding and communication features of the control circuit of FIG. 8.

Aspects of wireless communication and location finding provided by control circuit 308 are illustrated in one example shown in FIG. 11 at 1100. In this example, truck 103 and trailer 105 enter a predetermined area such as a parking lot 1113 surrounding a facility 1111. Facility 1111 may be a factory, terminal, warehouse, distribution center, office, or any other location accessible by truck 103 and trailer 105. Facility 1111 may include a remote device 1003 sending signals 1022 to establish any suitable communication link with nearby trailers carrying control circuit 308, while control circuit 308 may also be transmitting signals 1022 to establish and maintain any suitable available communication links such as links to a cellular network or other shorter range links as shown in FIG. 10. Thus trailer 105 may send regular or continuous updates to remote device 1003 indicating its geolocation and allowing remote device 1003 to calculate a distance between trailer 105 and the facility.

Remote device 1003 may specify a predefined geographical region 1103. This region may be defined by specifying a range from facility 1111 in all directions, or may be specified as a region bounded by a polygon defined according to vertices corresponding to specific geographical locations around facility 1111. Geographical region 1103 may also be defined according to the maximum range of the communication link maintained by remote device 1003. For example, in the case of a LoRa compliant communication link, the maximum range 1103 may thus be limited to less than 10 miles from remote device 1003. In another aspect, region 1103 may include, circumscribe, or be limited to, a political boundary such as a county, province, state, country and the like. Region information may be defined to include other geographical areas such as a neighborhood, a sports venue, a conference center, a state park, a street and/or an area within a predefined distance from a street, or business district, etc.

Geographical region 1103 may be used by remote device 1003 to compare the location of trailer 105 with the region 1103, and may be configured to take specific action when the truck is within the predetermined region. In this example, control circuit 308 relays location information to remote device 1003 thus allowing the remote device to determine that the truck is at a first location such as location 1104 outside the predetermined region 1103, and then later to determine that the truck is now at a second location 1105 that is inside the predetermined region. As the vehicle crosses over this boundary, remote device 1003 may be configured to take specific actions such as establish a communication link with the control circuit, or send information to, or receive information from control circuit 308. For example, remote device 1003 may be configured to retrieve all available data from memory 827 which may have been logged as the vehicle was traveling in places where establishing and maintaining a communication link was not possible.

In another example, remote device 1003 may access permission about the status of trailer components such as lamps, the ABS brake system, and the like. Remote device 1003, such as a server 1013, may automatically formulate maintenance work orders, or similar information specifying specific components in the trailer 105 or truck 103 that require maintenance. Remote device 1003 may then automatically send this maintenance information to the personal computing devices of individuals at the facility responsible for handling the maintenance of trailer 105 or truck 103. In some instances, these messages may be received by maintenance personnel before truck 103 and trailer 105 have come to a stop at the facility, or left the facility thus allowing a more rapid response from maintenance personnel, reduced downtime and increased uptime.

Data retrieved from control circuit 308 is not limited to maintenance information, but may include information about the cargo being hauled in trailer 105, the route traveled, speed information such as average, high, and low speeds at different times of day, detailed information about the specific path taken from one location to another, and the like. This information may be used by remote device 1003 for planning future routes, tracking the performance of particular drivers or vehicles, optimizing times of day, types of loads carried, and/or planning alternative destinations for future deliveries, avoiding congested sections of the road, and the like. This data may be retrieved as trailer 105 enters the predefined region, or may be sent automatically via periodic updates as the vehicle travels, at predetermined times of day, or continuously as the information is obtained by control circuit 308.

As discussed above, control circuit 308 may be configured to determine the status of one or more trailer components electrically connected to the trailer terminals. Control circuit 308 may be configured to send and/or receive data or signals from trailer components of trailer 105 using any suitable combination of wires in trailer wiring 105. Control circuit 308 advantageously may be configured to electrically connect trailer terminals 318 to a variety of trailer cable systems 718, including, but not limited to, existing four wire, five wire, six wire, or seven wire cable systems, found in many truck trailers.

Control circuit 308 may be configured to send control messages or signals using trailer component control circuit 847 and/or other aspects of control circuit 308. In another aspect, the status data and other operational messages, or other signals sent by trailer components 900 may be received by trailer component control circuit 847. For example, control circuit 847 may send an activation message to a backup camera trailer component. The backup camera may begin capturing video imagery from behind the trailer. The captured video imagery may then be passed back to control circuit 847 as operational messages or signals providing control circuit 308 with access to real-time video imagery. Status information, as well as operational data (e.g. a video feed), may optionally be saved to memory 827 or passed to a display device in truck 103 that is accessible to the driver.

The control circuit 847 may be configured as a "master" node configured to send signals representing trigger data, commands, messages, or control signals to trailer components 900, and to receive and process status or operational information sent from trailer components 900. Such status information may include whether the trailer component is working properly, or whether specific internal aspects of the trailer component have failed including information about which aspects are involved. Such status information may include outage of a lamp, camera malfunction, sensor failure, and the like. When the control circuit is configured as a "master", trailer components 900 may be individually configured as separate, "slave" nodes that receive and respond to instructional or control signals sent from the master, and that also send status information or other data to the master node.

Trailer components 900 may optionally include component control circuitry electrically connected to the trailer wiring 718. This component control circuitry may be configured to send and/or receive data, receive power, or respond to control signals sent through the trailer wiring 718 from control circuit 308 or 847. In one example, the multiple components of the truck trailer 105 include a component control circuit electrically connected to at least one of the power cables and the ground cable of trailer wiring 718. The trailer component (an electronic device) may be electrically connected to the component control circuit, and the component control circuit may be configured to receive the component control signals sent by the control circuit 308.

The component control circuit specific to each trailer component, or group of trailer components, may be configured to selectively control the operation of the electronic device it is coupled to. For example, a temperature sensor 929 may include component control logic for obtaining temperature data from temperature sensor elements in sensor 929 and periodically sending that temperature data to control circuit 308. In another example, a right turn lamp 225 (and other trailer components) may receive continuous power from control circuit 308 through electrical connections to trailer terminals 318.

Control circuitry in the individual trailer components 900 may include switching and timing circuitry that may be activated by a command sent from control circuit 308 causing the right turn lamp to periodically activate and deactivate causing the lamp to operate in a blinking mode. The component control circuitry may optionally send a reply message back to control circuit 308 indicating that the message was received and that the specific trailer component has changed states and is operating as requested. Control circuit 308 may be configured to expect response messages from all trailer components 900 when requested, at predetermined periodic intervals, or at other times thus allowing control circuit 308 to maintain status information about each trailer component and send data to a remote device 1003 indicating which components are not responsive, or sending out error code information. In another aspect, this data may be saved in memory 827 and relayed to the remote device 1003 at a later time such as when the trailer returns to a facility 1111.

In another aspect the component control circuitry is optionally included in a component connector that may be constructed specifically for a particular type of trailer component 900 thus allowing trailer component 900 to be free of component specific control circuitry that may be specific to particular trailer cable system. Thus a standard component such as a standard LED or incandescent right turn lamp may be coupled to component connector that includes the control circuitry. Trailer components 900 may then be free of logic and control circuitry for sending and/or receiving power, control signals, and data, but may still be configured to send status and other information to control circuit 308.

Control circuit 308 may be configured to communicate with components 900 using one or more, two or more, four more, or seven or more cables which may include multiple power cables and a single ground cable. In one example, the control circuit sends control signals to the components on a single power cable. The single power cable may be one of several cables in trailer wiring 718, or in another example, trailer wiring 718 may be limited to a single power cable, and a single ground cable. Triggering signals from control circuit 308 and status information sent from trailer components 900 may be received by modulating the power delivered on the single power cable without the need for any additional power cables, or without interfering with electrical connections of other power cables that may be included in trailer 105. Any suitable transmission technique may be used such as any type of Power-line Communication (PLC) system. In one example, the control circuit 308 is configured as a "master" node configured to send instructional or control signals and to receive and process status information, while the trailer components 900 are individually configured as separate, "slave" nodes that receive and respond to instructional or control signals sent from the master, and that also send status information to the master node.

Control circuitry specific to individual components receiving data over a single power cable may include a voltage regulator for regulating the voltage according to the needs of a microcontroller, processor, or other logic circuitry. Component control circuitry may also include a memory, which may be programmed to differentiate the role to be played by each individual trailer component coupled to the single power cable. For example, a microcontroller for a left turn signal may be configured or programmed to respond only to left turn commands, or possibly to other commands such as braking that may be sent by control circuit 308. Specific components may be assigned one or more address values specific to their location on the trailer and/or functional capabilities. These addresses may be maintained by the memory such that each trailer component may have a different address so that each component can identify itself individually and separate from other trailer components. In another aspect, groups of trailer components 900 may have other addressing data allowing them to respond together as a unit to certain messages.

In another aspect, the microcontroller specific to a given component 900 may be configured to monitor the state of trailer component and report the results to control circuit 308 by sending signals on the single power cable. The status data sent on the single power cable may include address information indicating to control circuit 308 which trailer component 900 is reporting status, as well as information about the status itself. For example, in the case of a left turn lamp, the component microcontroller may monitor and report when individual or multiple LED lamps included with trailer component 900 have failed or are failing. For example, failure codes, and specific information identifying the individual LED within a given turn signal lamp may be sent to control circuit 308. Any suitable status information specific to a given trailer component may be sent to control circuit 308.

In another example, trailer components 900 are electrically connected to a power cable, ground cable, and two or more other separate communications cables. These cables may be one of several cables in trailer wiring 718, or in another example, trailer wiring 718 may be limited to only four wires for power, ground and signaling purposes. These cables may be collectively or individually shielded to reduce or eliminate the effects of stray electrical or magnetic fields in the environment, or that might be created by the truck, the trailer, or the load carried by the trailer.

In this example, control circuit 308 sends the component control signals on the separate communications cables, and trailer components 900 may be configured to send status information and receive commands or triggering data as signals from control circuit 308 using the two or more communication cables. Any suitable transmission technique, architecture, or protocol using two signaling wires may be used, one example of which is a vehicle Control Area Network (CAN).

For example, trailer components 900 may include a trailer backup camera, a turn signal lamp, and a brake lamp, all of which are electrically connected to the power, ground, and communications cables. Each component is electrically connected to the common power supply, however, each component may be configured to respond only to control signals or messages appropriate for that component received over the communications cables.

For example, in operation, when a truck operator signals a right turn, the appropriate right turn signal lamp or lamps are activated in a "blinking" mode indicating to nearby drivers that a turn is imminent. Control circuit 308 receives signals from the truck indicating that the driver has activated the turn signal. Data signals representing this change in state are transmitted on the communications cables causing all trailer components 900 to receive the signals from control circuit 308. The signals may include information indicating which trailer component (e.g. right vehicle turn signal lamp) should respond, and may further indicate what activity should be taken. The signals may also include information indicating which trailer components should not respond. In the case of a right turn, it is advantageous for the right turn signal lamp to activate in a blinking mode while it may not be advantageous for other components to be activated as well. Thus, as discussed above, either the trailer components themselves may include component control circuitry, or this component control circuitry may be included in a socket, adaptor, or other connection point in the trailer wiring 718.

Trailer component control circuit 847 may include specific control circuitry to operate as a master node for the 4-wire CAN, some of which may in be included with CAN control circuit 851. The power, ground, and control cables may be electrically connected to a microcontroller which may be electrically connected to a transceiver of CAN control circuit 851. The transceiver in control circuit 851 may be electrically connected to the signaling cables of corresponding transceivers in each of the trailer components 900. Each trailer component 900 may include a microcontroller in the memory storing address information programmed into each specific component thus allowing control circuit 308 to individually request status from and send control signals to the individual trailer components 900.

Control circuit 308 is optionally adapted and configured to detect when components 900 are experiencing outages or failures. As noted above, one aspect of this involves requesting status information directly from each component 900. However in some instances, other techniques may be useful, where, for example the component 900 is not configured to report status, or the component 900 has failed to the extent that it cannot report its own status.

One example of an outage detection circuit 823 may include aspects or circuits for detecting failures in trailer components 900 such as LED lamps. In this example, outage detection circuit 823 may include a load element electrically coupled between a power supply and a ground reference. The detection circuit 823 may be configured and arranged to detect a failure in an LED lamp, and to modify current flowing through the load element. The control circuit is optionally configured to automatically increase power dissipated by the load element when the detection circuit detects a failure in the LED lamp. The load element can optionally be a thermistor and, furthermore, a Positive Temperature Coefficient (PTC) thermistor.

The outage detection circuit 823 may be configured to detect decreased power consumption by a trailer component 900 such as an LED lamp, or a specific LED in a LED lamp assembly. The decreased power consumption can be less than two hundred milliamps for a twelve volt supply voltage. The circuit can alternatively be configured to monitor the current draw of the LED lamp, a voltage across the LED lamp, a voltage in series with the lamp, or a voltage in parallel with the lamp. The outage detection circuit can be electrically in series between the LED lamp and the power cable.

The detection circuit 823 is optionally configured to detect changes after the detection of a fault in the LED lamp by detecting a first electrical current flow rate at a first time and a second electrical current flow rate at a second time, where the first flow rate is greater than the second flow rate and the voltage at the first time is substantially equal to the voltage at the second time. The detection circuit can include a variety of circuits that can further be electrically connected to a positive input of the LED lamp.

In another aspect, outage detection circuit 823 may provide outage detection for individual LED branches connected in parallel in a single vehicle lamp. The outage detection circuit 823 may include, but is not limited to, multiple parallel branches connected at a common positive reference node, with the parallel branches comprising a branch resistor and a branch switching device connected in series. A current source is optionally connected to the positive reference node and may be configured to deliver a substantially constant current to the positive reference node. A Zener diode or other voltage monitoring device is provided and arranged such that its cathode is connected to the positive reference node and its anode is connected to an outage detection output node. The branch switching devices may include a control input connected to a cathode of a corresponding one of the plurality of LEDs in trailer components 900. The switching devices may be configured to interrupt current flow through a corresponding branch resistor of the detection circuit when a corresponding LED fails open. When a predetermined number of LEDs fail open, the voltage at the positive reference node will rise above the breakdown voltage of the Zener diode, thereby triggering the Zener diode to supply current to the outage detection output node. This current may thus generate an outage detection or indication signal that may be acted on by control circuit 308. Although discussed here as it relates to outage detection circuit for LEDs, the circuit may be useful for outage detection in other trailer components 900, advantageously in situations where the outage of a given component or circuit within a component 900 has failed.

In another aspect, outage detection circuit 823 may include a microcontroller and a number of shunt resistors connected to at least one of the multiple trailer components 900. A current sensor may be configured to measure multiple instantaneous currents passing through the multiple shunt resistors, and a voltage sensor may be configured to optionally measure multiple instantaneous voltages across the shunt resistors. The microcontroller may be programmed or configured to recognize a failure condition if the instantaneous current through a given shunt resistor is below a low warning threshold value, and its instantaneous voltage is zero, or if instantaneous current through the shunt resistor is above a second high warning threshold value.

In operation, this example of outage detection circuit 823 may operate to obtain multiple current values for the individual shunt resistors at predetermined times, and from these determined a moving average current value associated with each resistor. The circuit may then determine whether any of the instantaneous current values are below a lower current threshold or above the upper high current threshold, and whether any of the instantaneous voltage values are zero. This information may then be used to determine which trailer components 900 have failed.

Glossary of Definitions and Alternatives

While examples of the inventions are illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example if the stated value is 4.375, then use of the term "about 4.375" generally means a range between 3.9375 and 4.8125.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff" angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Anti-lock Braking System" generally refers to a vehicle safety system that allows the wheels on a motor vehicle (including trailers) to maintain tractive contact with the road surface according to driver inputs while braking, preventing the wheels from locking up (ceasing rotation) and avoiding uncontrolled skidding. ABS systems automatically apply the principles of threshold braking and cadence braking albeit a much faster rate and with better control than drivers can typically manage manually. ABS systems include wheel speed sensors to detect reduced wheel rotation indicative of impending wheel lock. An ABS controller is also included that can automatically actuate the braking system to reduce braking force on the affected wheel or wheels, and to quickly reapply braking force when the danger of wheel lock is reduced. This overall feedback loop may be executed multiple times a second resulting in rapid activation and deactivation of braking force or "pulsing" of the brakes.

Maximum braking force is obtained with approximately 10-20% slippage between the braked wheel's rotational speed and the road surface. Beyond this point, rolling grip diminishes rapidly and sliding friction provides a greater proportion of the force that slows the vehicle. Due to local heating and melting of the tires, the sliding friction can be very low. When braking at, or beyond, the peak braking force, steering input is largely ineffective since the grip of the tire is entirely consumed in braking the vehicle.

Threshold braking seeks to obtain peak friction by maintaining the maximum braking force possible without allowing wheels to slip excessively. Braking beyond the slipping point causes tires to slide and the frictional adhesion between the tire and driving surface is thus reduced. The aim of threshold braking is to keep the amount of tire slip at the optimal amount, the value that produces the maximum frictional, and thus braking force. When wheels are slipping significantly (kinetic friction), the amount of friction available for braking is typically substantially less than when the wheels are not slipping (static friction), thereby reducing the braking force. Peak friction occurs between the static and dynamic endpoints, and this is the point that threshold braking tries to maintain.

"Cadence" braking or "stutter" braking involves pumping the brake pedal and is used to allow a car to both steer and brake on a slippery surface. ABS systems generally provide this behavior automatically and at a much higher rate than most drivers can manually produce. It is used to effect an emergency stop where traction is limited to reduce the effect of skidding from road wheels locking up under braking. This can be a particular problem when different tires have different traction, such as on patchy ice for example. Cadence braking maximizes the time for the driver to steer around the obstacle ahead, as it allows the driver to steer while slowing.

ABS generally offers improved vehicle control and decreases stopping distances on dry and slippery surfaces; however, on loose gravel or snow-covered surfaces, ABS can significantly increase braking distance, although still improving vehicle steering control.

"Bandwidth" generally refers to the maximum throughput of a logical or physical communication path in a communication system. Bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the bandwidth of a given digital communications network. Data networks may be rated according to their bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz.

Bandwidth may also be characterized according to the maximum transfer rate for a particular communications network. For example:

"Low Bandwidth" generally refers to a communications network with a maximum data transfer rate that is less than or about equal to 1,000,000 units of data per second. For example, in a digital communications network, the unit of data is a bit. Therefore low bandwidth digital communications networks are networks with a maximum transfer rate that is less than or about equal to 1,000,000 bits per second (1 Mbits/s).

"High Bandwidth" generally refers to a communications network with a maximum data transfer rate that is greater than about 1,000,000 units of data per second. For example, a digital communications network with a high bandwidth is a digital communications network with a maximum transfer rate that is greater than about 1,000,000 bits per second (1 Mbits/s).

"Cable" generally refers to one or more elongate strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongate strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used.

A cable may include a sheath or layer surrounding the cable with electrically non-conductive material to electrically insulate the cable from inadvertently electrically connecting with other conductive material adjacent the cable.

A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Cellular Device" generally refers to a device which sends or receives data, and/or sends or receives telephone calls using a cellular network. Cellular devices may thus be characterized as nodes in a communications link operating as an originating and/or final receiving node. A cellular device transmits to and receives from a cellular transceiver located in the cell (e.g. at a base unit or "cell tower.") Radio waves are generally used to transfer signals to and from the cellular device on a frequency that is specific (but not necessarily unique) to each cell. A cellular device may include a computer with memory, processor, display device, input/output devices, and so forth, and thus may be used as, and referred to as, a personal computing device.

"Cellular Network" or "mobile network" generally refers to a communications link or communications network where the final communications link to an originating sending node or final receiving node in the network is via a wireless link. The cellular network is distributed over land areas ("cells"), each cell served by at least one fixed-location transceiver known as a cell site, base station, or generically, a "cell tower". This base station provides the cell with the network coverage which can be used for transmission of voice, data and other types of communication. In a cellular network, each cell uses a different set of frequencies from neighboring cells, to avoid interference and provide guaranteed bandwidth within each cell.

In a cellular network, switching from one cell frequency to a different cell frequency is done electronically without interruption as various mobile devices with transceivers configured to communicate with the network (i.e. the originating or final receiver nodes) move from cell to cell during an ongoing continuous communication, all generally without a base station operator or manual switching. This is called the "handover" or "handoff." Typically, a new channel is automatically selected for the mobile device on the new base station which will serve it as the mobile device moves around in the cell. The mobile unit then automatically switches from the current channel to the new channel and communication continues. The most common example of a cellular network is a mobile phone (cell phone) network.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Communications cable" generally refers to a cable configured to carry digital or analog signals.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link configured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space via one or more sending and receiving antennas, or any combination thereof. Electromagnetic waves may be passed at any suitable frequency including any frequency in the electromagnetic spectrum.

A communication link may include any suitable combination of hardware which may include software components as well. Such hardware may include routers, switches, networking endpoints, repeaters, signal strength enters, hubs, and the like.

In the case of a logical link, the communication link may be a conceptual linkage between the sender and recipient such as a transmission station in the receiving station. Logical link may include any combination of physical, electrical, electromagnetic, or other types of communication links.

"Control Area Network (CAN)" or "CAN bus" generally refers to a communication system and network protocol that may be used for intercommunication between components or subsystems of a vehicle. A CAN (sometimes referred to colloquially as a "CAN bus") allows one or more microcontrollers or CAN enabled devices to communicate with each other in real time without a host computer. A CAN may physically connect all nodes together through a two wire bus. The wires may be a twisted pair cable with a 120 ohm characteristic impedance. These wires may be thought of as "high" and "low" connections.

CAN may be thought of as an example of a multi-master serial bus for connecting Electronic Control Units (ECUs) also referred to as "nodes". Two or more nodes are required on the CAN network to communicate. The complexity of the node can range from a simple I/O device such as a sensor, an active device such as a lamp, transmission, or brake actuator, or an embedded computer or ECU with a CAN interface. A node may also be a gateway allowing a standard computer to communicate over a network connection such as a Universal Serial Bus (USB) or Ethernet port allowing outside devices to be selectively added or removed from the CAN network.

A CAN bus does not require any addressing schemes, as the nodes of the network use unique identifiers that may be provided by programming the individual node before use, or reprogramming between uses. This provides the nodes with information regarding the priority and the urgency of transmitted message.

Each node may include a central processing unit, microprocessor, or host processor. The host processor may be configured to determine what the received messages mean and what messages to transmit in response. A node may be electrically connect to sensors, actuators, lamps, or other electronic devices that can be connected to the host processor. A node may also include a CAN controller, optionally integrated into the microcontroller. The can control may implement the sending and receiving protocols. When receiving, the CAN controller may store the received serial bits from the bus until an entire message is available, which can then be fetched by the host processor (for example, by the CAN controller triggering an interrupt). When sending, the host processor may send the transmit message(s) to the CAN controller, which transmits the bits serially onto the bus when the bus is free. A node may also include a transceiver. When receiving: the transceiver may convert the data stream from CAN bus levels to levels that the CAN controller uses. It may have protective circuitry to protect the CAN controller. When transmitting, the transceiver may convert the data stream from the CAN controller to CAN bus levels.

Each node may be configured to send and receive messages, but not simultaneously. A message or Frame consists primarily of the ID (identifier), which represents the priority of the message, and up to eight data bytes. A CRC, acknowledge slot (ACK) and other overhead are also part of the message. The improved CAN FD extends the length of the data section to up to 64 bytes per frame. The message is transmitted serially onto the bus using a non-return-to-zero (NRZ) format and may be received by all nodes.

CAN data transmission may use a lossless bitwise arbitration method of contention resolution. This arbitration method may require all nodes on the CAN network to be synchronized to sample every bit on the CAN network at the same time. Thus data may be transmitted without a clock signal in an asynchronous format.

The CAN specifications may use the terms "dominant" bits and "recessive" bits where dominant is a logical 0 (actively driven to a voltage by the transmitter) and recessive is a logical 1 (passively returned to a voltage by a resistor). The idle state may be represented by the recessive level (logical 1). If one node transmits a dominant bit and another node transmits a recessive bit then a collision results and the dominant bit "wins". This means there is no delay to the higher-priority message, and the node transmitting the lower priority message automatically attempts to retransmit, for example, six bit clocks after the end of the dominant message.

All nodes on the CAN network generally operate at the same nominal bit rate, but noise, phase shifts, oscillator tolerance and oscillator drift mean that the actual bit rate may not be the same as the nominal bit rate. Since a separate clock signal is not used, a means of synchronizing the nodes is used. Synchronization is helpful during arbitration since the nodes in arbitration may see both their transmitted data and the other nodes' transmitted data at the same time. Synchronization is also helpful to ensure that variations in oscillator timing between nodes do not cause errors.

Synchronization may start with a hard synchronization on the first recessive to dominant transition after a period of bus idle (the start bit). Resynchronization may occur on every recessive to dominant transition during the frame. The CAN controller may expect the transition to occur at a multiple of the nominal bit time. If the transition does not occur at the exact time the controller expects it, the controller adjusts the nominal bit time accordingly.

Examples of lower-layer (e.g. levels 1 and 2 of the ISO/OSI model), are commercially available from the International Standardization Organization (ISO) and include ISO 11898-1 through 11898-6, as well as ISO 16845-1 and 16845-2.

CAN standards may not include application layer protocols, such as flow control, device addressing, and transportation of data blocks larger than one message, as well as, application data. Other CAN standards are available that are optimized for specific fields of use. These include, but are not limited to:

ARINC 812 or ARINC 825 (for the aviation industry)
CANopen—EN 50325-4 (used for industrial automation)
DeviceNet (used for industrial automation)
EnergyBus—CiA 454 (used for light electrical vehicles)
ISOBUS—ISO 11783 (agriculture)
ISO-TP—ISO 15765-2 (Transport protocol for automotive diagnostic)
SAE J1939 (In-vehicle network for buses and trucks)
MilCAN
NMEA 2000—IEC 61162-3 (marine industry)
Unified Diagnostic Services (UDS)—ISO 14229 (automotive diagnostics)
CANaerospace—Stock (for the aviation industry)
CAN Kingdom—Kvaser (embedded control system)
CCP/XCP (automotive ECU calibration)
GMLAN—General Motors (for General Motors)
RV-C—RVIA (used for recreational vehicles)
SafetyBUS p—Pilz (used for industrial automation)
UAVCAN (aerospace and robotics)

"Controller" generally refers to a mechanical or electronic device configured to control the behavior of another mechanical or electronic device. A controller may include a "control circuit" configured to provide signals or other electrical impulses that may be received and interpreted by the controlled device to indicate how it should behave.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Wash., USA; MySQL and various versions of the Oracle DBMS, often referred to as simply "Oracle" both separately offered by the Oracle Corporation of Redwood City, Calif., USA; the DBMS generally referred to as "SAP" provided by SAP SE of Walldorf, Germany; and the DB2 DBMS provided by the International Business Machines Corporation (IBM) of Armonk, N.Y., USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Diode" generally refers to a two terminal electrical device which allows current to flow in one direction, but prevents current from flowing in the opposite direction. Examples include p-n silicon junction diodes, light emitting diodes, Schottky diodes, and Zener diodes, to name a few.

"Electrically connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Geolocation" or "Geopositioning" generally refers identifying the location of, or the location itself of, a "real-world" or "physical" geographic location or location of an object, such as a position on the globe, the position of a topographical feature, a building, a particular source of electromagnetic radiation, a mobile phone or an network-connected computer. Thus geolocation may be used as a verb referring to the practice of assessing the physical location, or in the noun form as the actual assessed location itself. In this usage, geolocation can refer to the latitude and longitude coordinates of a particular location as defined by ISO/IEC 19762-5:2008. Geolocation is closely related to the use of positioning systems such as the Global Positioning System (GPS), and may include determining a recognizable location coordinate (e.g. a street address) rather than just a set of geographic coordinates.

A geolocation/geopositioning module, engine, or device may use any suitable positioning system or positioning technology. For example a geolocation module may use radio frequency (RF) location methods, such as Multilateration or Time Difference Of Arrival (TDOA) to geolocate an object. GPS is an example of a TDOA geolocation system. TDOA systems often utilize mapping displays or other geographic information system. When a GPS signal is unavailable, geolocation modules may use cellular signal data associated with a mobile device obtained from cell towers to triangulate the approximate position of the mobile device, a method that may not be as accurate as GPS. This is in contrast to earlier radiolocation technologies, for example Direction Finding where a line of bearing to a transmitter is achieved as part of the process.

A geolocation module or engine may also rely on internet and computer geolocation that may be performed by associating a geographic location with the Internet Protocol (IP) address, MAC address, RFID, hardware embedded article/production number, embedded software number (such as UUID, Exif/IPTC/XMP or modern steganography), invoice, Wi-Fi positioning system, device fingerprint, canvas fingerprinting or device GPS coordinates, or other, perhaps self-disclosed information. Network geolocation may work by automatically looking up an IP address on a WHOIS service and retrieving the registrant's physical address.

IP address location data can include information such as country, region, city, postal/zip code, latitude, longitude and timezone. Deeper data sets can determine other parameters such as domain name, connection speed, ISP, language, proxies, company name, Designated Market Area (DMA), Metro Survey Areas (MSA), North American Industry Classification System (NAICS) codes, and home/business.

"Ground" or "circuit ground" generally refers to a node in an electrical circuit that is designated as a reference node for other nodes in a circuit. It is a reference point in an electrical circuit from which voltages are measured, a common return path for electric current, and/or a direct physical connection to the Earth.

"Ground cable" generally refers to a cable electrically connecting to a circuit ground.

"J-560 Compliant cabling system" generally refers to a cable system with multiple individual wires forming separate circuits in a truck trailer conforming to the Society of Automotive Engineers (SAE) J-560 standard. The J-560 standard requires an 8 AWG chassis ground wire, typically colored white, a 10 AWG wire (typically red) that is dedicated to brake or stop lamps, and a 10 AWG wire (often blue) that is dedicated to provide continuous ABS primary power and, alternatively, power for auxiliary devices. Four 12 AWG wires are commonly included (such as the yellow, green, brown, and black) wires, with the yellow wire dedicated to the left turn signal and hazard lamps, the green wire dedicated to the right turn signal and hazard lamps, the brown wire dedicated for tail and license plates and clearance and/or side marker lamps, and the black wire dedicated for clearance, side marker, and identification lamps. Thus, the conventional J-560 compliant cable system has an aggregate cross-sectional area of about 32 mm$^2$ calculated as the aggregate of four metallic 12 AWG cables each with a cross-sectional area of 3.3 mm$^2$, two metallic 10 AWG cables each with a cross-sectional area of 5.3 mm$^2$, one metallic 8 AWG cables each with a cross-sectional area of 8.4 mm$^2$.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-halide, mercury-vapor, sulfur, neon, sodium-vapor, or others.

"Light Emitting Diode" or "LED" generally refers to a diode that is configured to emit light when electrical power passes through it. The term may be used to refer to single diodes as well as arrays of LED's and/or grouped light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

"Lead" generally refers to an electrical conductor physically coupling and electrically connecting two other electrical conductors. Examples of a lead include traces between electrical components on a Printed Circuit Board (PCB), or wires electrically connecting to portions of an electrical circuit. A bundle of wires electrically connection multiple circuits together may be thought of as a single lead, or as multiple separate leads.

"LED Lamp" generally refers to an electrical device that uses Light Emitting Diodes (LEDs) to produce light using electrical power. A lamp may include a single LED, or multiple LEDs.

"LED fault signal" generally refers to a signal that is used to indicate the failure of an LED. The LED fault signal can take the form of power to illuminate a fault LED, a data message (such as via a serial communication protocol or other), a mechanical indicator, or other. The LED fault signal can be used to communicate a failed LED to an onboard computer or display system such as may be found in the cabin of a vehicle or a trailer.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Microcontroller" or "MCU" generally refers to a small computer on a single integrated circuit. It may be similar to, but less sophisticated than, a System on a Chip or "SoC"; an SoC may include a microcontroller as one of its components. A microcontroller may contain one or more CPUs (processor cores) along with memory and programmable input/output peripherals. Program memory in the form of ferroelectric RAM, NOR flash or OTP ROM may also be included on the chip, as well as a small amount of RAM. Microcontrollers may be designed for embedded applications, in contrast to the microprocessors used in personal computers or other general purpose applications consisting of various discrete chips.

Microcontrollers may be included in automatically controlled products and devices, such as automobile engine control systems, implantable medical devices, remote controls, office machines, appliances, power tools, toys and other embedded systems. An MCU may be configured to handle mixed signals thus integrating analog components needed to control non-digital electronic systems.

Some microcontrollers may use four-bit words and operate at frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance roles, where they may need to act more like a Digital Signal Processor (DSP), with higher clock speeds and power consumption. A microcontroller may include any suitable combination of circuits such as:

1. a central processing unit—ranging from small and simple processors with registers as small as 4 bits or list, to complex processors with registers that are 32, 64, or more bits
2. volatile memory (RAM) for data storage
3 ROM, EPROM, EEPROM or Flash memory for program and operating parameter storage
4. discrete input and output bits, allowing control or detection of the logic state of an individual package pin
5. serial input/output such as serial ports (UARTs)
6. other serial communications interfaces like I²C, Serial Peripheral Interface and
7. Controller Area Network for system interconnect peripherals such as timers, event counters, PWM generators, and watchdog
8. clock generator—often an oscillator for a quartz timing crystal, resonator or RC circuit
9. many include analog-to-digital converters, some include digital-to-analog converters
10. in-circuit programming and in-circuit debugging support "Modulation" generally refers to a process of varying one or more properties of a signal using a separate signal that typically contains information to be transmitted. It may be thought of as merging the properties of two time-varying signals to create a third output signal that is the combination of both input signals. Modulation is useful in process of conveying data, such as in the case of transmitting a digital bit stream or an analog (continuously varying) signal using electromagnetic energy.

Analog modulation may transfer an analog baseband (or low pass) signal, for example an audio signal or TV signal, over an analog bandpass channel at a different frequency, for example over a limited radio frequency band or a cable TV network channel. Digital modulation may transfer a digital bit stream over an analog communication channel, for example over the public switched telephone network (where a bandpass filter limits the frequency range to 300-3400 Hz) or over a limited radio frequency band. Analog and digital modulation facilitate Frequency Division Multiplexing (FDM), where several low pass information signals are transferred simultaneously over the same shared physical medium, using different carrier frequencies. Digital baseband modulation, also known as "line coding", can transfer a digital bit stream over a baseband channel, typically a non-filtered copper wire such as a serial bus or a wired local area network. Pulse modulation may transfer a narrowband analog signal, for example, a phone call over a wideband baseband channel or, in some of the schemes, as a bit stream over another digital transmission system.

As used herein, analog modulation techniques may include, but is not limited to, any of the following alone or in combination:
  1. Amplitude modulation (AM) (here the amplitude of the carrier signal is varied in accordance with the instantaneous amplitude of the modulating signal)
  2. Double-sideband modulation with carrier (DSB-WC) (used on the AM radio broadcasting band)
  4. Double-sideband suppressed-carrier transmission (DSB-SC)
  5. Double-sideband reduced carrier transmission (DSB-RC)
  6. Single-sideband modulation with carrier (SSB-WC)
  8. Single-sideband modulation suppressed carrier modulation (SSB-SC)
  9. Vestigial sideband modulation (VSB, or VSB-AM)
  10. Quadrature amplitude modulation (QAM)
  11. Frequency modulation (FM) (here the frequency of the carrier signal is varied in accordance with the instantaneous amplitude of the modulating signal)

13. Phase modulation (PM) (here the phase shift of the carrier signal is varied in accordance with the instantaneous amplitude of the modulating signal)
14. Transpositional Modulation (TM), in which the waveform inflection is modified resulting in a signal where each quarter cycle is transposed in the modulation process.

In digital modulation, an analog carrier signal may be modulated by a discrete signal. Digital modulation methods can be considered as digital-to-analog conversion and the corresponding demodulation or detection as analog-to-digital conversion. The changes in the carrier signal are chosen from a finite number of M alternative symbols (the modulation alphabet). As used herein, digital modulation techniques may include, but is not limited to, any of the following used either alone or in combination:

1. Binary PSK (BPSK), using M=2 symbols
2. Quadrature PSK (QPSK), using M=4 symbols
3. 8PSK, using M=8 symbols
4. 16PSK, using M=16 symbols
5. Differential PSK (DPSK)
6. Differential QPSK (DQPSK)
7. Offset QPSK (OQPSK)
8. π/4-QPSK
9. Audio frequency-shift keying (AFSK)
10. Multi-frequency shift keying (M-ary FSK or MF SK)
11. Dual-tone multi-frequency (DTMF)
12. Amplitude-shift keying (ASK)
13. On-off keying (OOK), the most common ASK form
14. M-ary vestigial sideband modulation, for example 8VSB
15. Quadrature amplitude modulation (QAM), a combination of PSK and ASK
16. Polar modulation like QAM a combination of PSK and ASK
17. Minimum-shift keying (MSK)
18. Gaussian minimum-shift keying (GMSK)
19. Continuous-phase frequency-shift keying (CPFSK)
20. Orthogonal frequency-division multiplexing (OFDM) modulation
21. Discrete multitone (DMT), including adaptive modulation and bit-loading
22. Wavelet modulation
23. Trellis coded modulation (TCM), also known as Trellis modulation
24. Direct-sequence spread spectrum (DSSS)
25. Chirp spread spectrum (CSS) according to IEEE 802.15.4a CSS uses pseudo-stochastic coding
26. Frequency-hopping spread spectrum (FHSS) applies a special scheme for channel release "Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a low power wireless Personal Area Network using IPv6 (6LoWPAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Network Appliance" generally refers to a computer specifically configured to perform a predetermined set of one or more network related functions on a computer network. For example, computers dedicated to a single function such as firewall, web server, router, switch, hub, encryption device, a wireless endpoint or repeater, an SSL/TLS proxy, also known as a Break aNd Inspect (BNI) device, file server, data cache, database server, and the like may be thought of as "network appliances". A single network appliance may include multiple functions such as firewall, web server, Domain Name Service (DNS) server, file server, router, and switch.

"Optionally" as used herein means discretionary; not required; possible, but not compulsory; left to personal choice.

"Predominately" as used herein is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qalcomm of San Diego, Calif., USA.

A processor also includes Application-Specific Integrated Circuit (ASIC). An ASIC is an Integrated Circuit (IC) customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Power Cable" generally refers to a cable configured to transfer electrical power as part of an electrical circuit. A power cable may be used exclusively to transfer power, or it may be used to also transfer signals, such as in the case of a Power Line Communication (PLC) system.

"Power Line Communication" (PLC) or generally refers to a system of electronic communication that transmits and receives signals on the same circuit used to transfer power. Examples including system that send data over common AC wiring in a home, or Broadband over Power Line (BPL) systems for carrying network traffic over high voltage transmission lines, as well as systems for in-vehicle communications.

In the vehicle context, data, voice, music and video signals may be transferred to throughout a vehicle by over direct current DC battery power-line. One example of is DC-BU, a technology for reliable and economical communication over noisy DC or AC power lines. Digital input data may be modulated and carried over the power line and then demodulated into the original digital data up receipt.

In DC-BUS or other PLC implementations, the signaling technology is byte oriented, allowing transfer of a single UART data byte or more over noisy channel (such as the powerline) at bit-rate up to 115.2 kbit/s, each transmitted byte is protected against errors caused by noisy environment. This method may operate on a channel ranging in the HF band. A narrow band signaling modulation may be used that is based on a combination of phase changes to transfer each byte. There is no restriction to the number of bytes. Any Universal Asynchronous Receiver-Transmitter (UART) based standards such as RS-232, RS-485 and LIN-bus can use a DC-BUS as a physical layer (as referred to in the OSI model).

"Sensor" generally refers to a transducer configured to sense or detect a characteristic of the environment local to the sensor. For example, sensors may be constructed to detect events or changes in quantities or sensed parameters providing a corresponding output, generally as an electrical or electromagnetic signal. A sensor's sensitivity indicates how much the sensor's output changes when the input quantity being measured changes.

"Signal" generally refers to a function or means of representing information. It may be thought of as the output of a transformation or encoding process. The concept generally includes a change in the state of a medium or carrier that conveys the information. The medium can be any suitable medium such as air, water, electricity, magnetism, or electromagnetic energy such as in the case of radio waves, pulses of visible or invisible light, and the like.

As used herein, a "signal" implies a representation of meaningful information. Arbitrary or random changes in the state of a carrier medium are generally not considered "signals" and may be considered "noise". For example, arbitrary binary data streams are not considered as signals. On the other hand, analog and digital signals that are representations of analog physical quantities are examples of signals. A signal is commonly not useful without some way to transmit or send the information, and a receiver responsive to the transmitter for receiving the information.

In a communication system, for example, a transmitter encodes a message to a signal, which is carried to a receiver by the communications channel. For example, the words "The time is 12 o'clock" might be the message spoken into a telephone. The telephone transmitter may then convert the sounds into an electrical voltage signal. The signal is transmitted to the receiving telephone by wires, at the receiver it is reconverted into sounds.

Signals may be thought of as "discrete" or "continuous." Discrete-time signals are often referred to as time series in other fields. Continuous-time signals are often referred to as continuous signals even when the signal functions are not continuous, such as in a square-wave signal.

Another categorization is signals which are "discrete-valued" and "continuous-valued". Particularly in digital signal processing a digital signal is sometimes defined as a sequence of discrete values, that may or may not be derived from an underlying continuous-valued physical process. In other contexts, digital signals are defined as the continuous-time waveform signals in a digital system, representing a bit-stream. In the first case, a signal that is generated by means of a digital modulation method may be considered as converted to an analog signal, while it may be considered as a digital signal in the second case.

"Socket" generally refers a device into which something fits in order to electrically and/or physically connect another electrical device to a circuit.

"Stop-tail-turn Lamp" or "STT Lamp" generally refers to a lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108.

"Terminal" generally refers to a wire, post, receptacle, plug, socket or other connection (male, female, mixed, hermaphroditic, or otherwise) for mechanically and electrically connecting two or more wires or other conductors.

"Truck" generally refers to a powered truck (also known as a tractor or cab) for pulling a trailer.

"Vehicle" generally refers to a self-propelled or towed device for transportation, including without limitation, car, truck, bus, boat, tank or other military vehicle, airplane, truck trailer, truck cab, boat trailer, other trailer, emergency vehicle, and motorcycle.

What is claimed is:

1. A mount for a trailer nose box, comprising:
    a baseplate defining at least four plate mounting holes corresponding to at least four trailer mounting holes on the trailer nose box;
    a circuit housing coupled to the baseplate, the circuit housing including:
        at least seven nose box terminals extending from the housing, the seven nose box terminals including a ground cable terminal and six separate power cable terminals;
        at least two trailer terminals extending from the circuit housing, the trailer terminals including a trailer ground terminal and at least one trailer power terminal; and
        a control circuit within the circuit housing, the control circuit having a communication circuit configured to establish at least one communication link with a remote device;
        a location finding circuit configured to determine a geographic location of the nose box mount on the earth, wherein the location finding circuit is configured to triangulate the geographic location using signals from at least one transmitter sending signals received by the location finding circuit;
        wherein the control circuit is configured to send the geographic location to the remote device using the at least one communication link,
        wherein the control circuit is configured to electrically connect the nose box terminals to the trailer terminals,
        wherein the control circuit is configured to determine a status of one or more trailer components electrically connected to the at least two trailer terminals,
        wherein the control circuit is configured to use the communication link to send data defining the status of the one or more trailer components, and
        wherein the communication link is separate from the ground cable and the six separate power cables.

2. The mount of claim 1, wherein the at least seven nose box terminals correspond to seven connection terminals of a conventional J-560 trailer connection.

3. The mount of claim 1, wherein the at least one trailer power terminals includes six power terminals corresponding to a J-560 trailer connection.

4. The mount of claim 1, further comprising:
    at least one communications terminal configured to electrically connect to a communications bus, wherein the control circuit is configured to receive data and send data to trailer components electrically connected to the communications bus.

5. The mount of claim 1, wherein the communication circuit further comprises:
    at least one antenna; and
    wherein the communication circuit is configured to send data wirelessly to the remote device using the at least one antenna.

6. The mount of claim 1, wherein the at least one communication link includes at least one of the following or any combination thereof:
    a Bluetooth wireless communication link that sends the data according to the Bluetooth protocol,
    a LoRa communication link that sends the data according to the LoRa protocol,
    a communication link that conforms to the Institute of Electrical and Electronics Engineers (IEEE) 802.15.4 specification,
    a communication link that conforms to any one or more of the IEEE 802.11 family of wireless protocols,
    a cellular telephone communication link.

7. The mount of claim 1, wherein the control circuit further comprises:
    a memory, wherein the control circuit is configured to record in the memory the status of the one or more trailer components at a first time, and wherein the control circuit is configured to obtain the status from the memory and send the data to the remote device at a second time that is later than the first time.

8. The mount of claim 1, wherein the control circuit further comprises:
    an energy harvesting control circuit configured to obtain data defining the status of an energy harvesting device, and to send data defining changes in operation of the energy harvesting device.

9. The mount of claim 1, wherein the control circuit further comprises:
    a memory; and
    at least one accelerometer, wherein the control circuit is configured to store in the memory accelerometer data received from the accelerometer, wherein the control circuit is configured to send the accelerometer data to the remote device using the at least one communication link.

10. The mount of claim 1, wherein the control circuit further comprises:
   a trailer component control circuit that is electrically connected to the at least two trailer terminals, the trailer component control circuit configured to generate trailer component control signals for one or more trailer components,
   wherein the trailer component control signals are sent to the at least one power terminal.

11. The mount of claim 10, wherein the trailer component control circuit further comprises:
   a Control Area Network (CAN) control circuit having a CAN transceiver, the CAN control circuit electrically connected to at least one CAN terminals adapted to connect to at least one CAN communications cable,
   wherein the CAN control circuit is configured to generate the trailer component control signals for the one or more trailer components using the CAN transceiver.

12. The mount of claim 1, wherein the control circuit further comprises:
   an environmental monitoring circuit responsive to one or more environmental sensors, wherein the control circuit is configured to obtain environmental data from the environmental monitoring circuit and send the environmental data to the remote device,
   wherein the control circuit is configured to send the remote device using the at least one communication link.

13. The mount of claim 1, wherein the at least two trailer terminals include six separate trailer power cables, and one separate trailer ground cable.

14. The mount of claim 1, wherein the control circuit further comprises:
   an outage detection circuit responsive to one or more trailer components, wherein the control circuit is configured to determine an outage that occurs when the one or more trailer components has failed, and to send data about the one or more trailer components to the remote device using the at least one communication link.

15. The mount of claim 14, wherein the outage detection circuit is configured to monitor changes in voltage between at least two of the trailer terminals to determine an outage.

16. The mount of claim 14, wherein the outage detection circuit is configured to monitor an electrical current passing through at least one trailer power terminal to determine an outage.

17. The mount of claim 1, wherein the at least one communication circuit includes any one or more of: an RS-232 compatible port, an Ethernet compatible port, or a Universal Serial Bus (USB) compatible port.

18. The mount of claim 1, wherein the baseplate defines a central opening adapted to receive at least two wires electrically connected to the at least two trailer terminals.

19. The mount of claim 1, wherein at least two of the four trailer mounting holes are about 4.4 inches apart, and wherein at least two other of the four trailer mounting holes are about 3.8 inches apart.

20. A nose box assembly for a truck trailer, comprising:
   a receptacle having six separate power terminals and one ground terminal, wherein the power terminals and ground terminal are arranged in the receptacle to conform to a standard J-560 trailer connection;
   a nose box defining a front and rear openings, the receptacle coupled to the nose box at the front opening, the front opening defining a generally six-sided peripheral shape;
   a baseplate defining multiple plate mounting holes, the baseplate mounted at the rear opening of the nose box;
   a circuit housing coupled to the baseplate, the circuit housing including:
      a receptacle ground terminal electrically connected to the ground terminal of the receptacle, and six separate power cable terminals electrically connected to the power terminals of the receptacle;
      at least two trailer terminals extending from the circuit housing, the trailer terminals including a trailer ground terminal and at least one trailer power terminal;
         a control circuit within the circuit housing, the control circuit having a communication circuit configured to establish at least one communication link with a remote device, the communication link separate from the ground terminal and the six separate power terminals,
         wherein the control circuit is configured to electrically connect the receptacle terminals to the trailer terminals,
         wherein the control circuit is configured to determine a status of one or more trailer components electrically connected to the at least two trailer terminals, and
         wherein the control circuit is configured to use the communication link to send data defining the status of the one or more trailer components;
   a location finding circuit configured to determine a geographic location of the nose box mount on the earth, wherein the location finding circuit is configured to triangulate the geographic location using signals from at least one transmitter sending signals received by the location finding circuit;
   wherein the control circuit is configured to send the geographic location to the remote device using the at least one communication link,
   wherein the baseplate is mounted the rear opening of the nose box;
   wherein the circuit housing is mounted to the baseplate and the circuit housing is enclosed within the nose box; and
   wherein a rear side of the enclosure and the baseplate are mounted to the truck trailer by multiple fasteners passing through multiple mounting holes defined by the baseplate and the nose box, and into the trailer.

21. The nosebox assembly of claim 20, wherein the communication circuit further comprises:
   at least one antenna, wherein the communication circuit is configured to send data wirelessly to the remote receiver using the at least one antenna.

22. The nosebox assembly of claim 20, wherein the at least one communication link includes at least one of the following or any combination thereof:
   a Bluetooth wireless communication link that sends the data according to the Bluetooth protocol,
   a LoRa communication link that sends the data according to the LoRa protocol,
   a communication link that conforms to the Institute of Electrical and Electronics Engineers (IEEE) 802.15.4 specification,
   a communication link that conforms to any one or more of the IEEE 802.11 family of wireless protocols,
   a cellular telephone communication link.

23. The nosebox assembly of claim 20, wherein the at least one communication link includes at least one of the following or any combination thereof: an RS-232 compatible port, an Ethernet compatible port, or a Universal Serial Bus (USB) compatible port.

24. The nosebox assembly of claim 20, wherein the control circuit further comprises:
   a memory;
   at least one accelerometer, wherein the control circuit is configured to store in the memory accelerometer data received from the accelerometer,
   wherein the control circuit is configured to send the accelerometer data to the remote device using the at least one communication link.

25. The nosebox assembly of claim 20, wherein the control circuit further comprises:
   a trailer component control circuit that is electrically connected to the at least two trailer terminals, the trailer component control circuit configured to generate trailer component control signals for one or more trailer components,
   wherein the trailer component control signals are carried by an at least one power cable electrically connected to the at least one power terminal.

26. The nosebox assembly of claim 25, wherein the at least one trailer power terminal includes six trailer power terminals, and wherein the trailer components are mounted to the truck trailer and include any combination of: a running lamp, interior illumination lamp, clearance lamp, backup lamp, license plate lamp, stop lamp, tail lamp, turn lamp, stop-tail-turn lamp, Anti-lock Braking controller, brake pressure sensor, cargo area temperature sensor, door sensor, cargo sensor, humidity sensor, tank level sensor, proximity sensor, tire pressure sensor, refrigeration system temperature sensor, refrigeration system controller, backup camera, or side camera.

27. The nosebox assembly of claim 25, wherein the trailer component control circuit further comprises:
   a Control Area Network (CAN) control circuit having a CAN transceiver, the CAN control circuit electrically connected to at least one CAN terminals adapted to connect to at least one CAN communications cable,
   wherein the CAN control circuit is configured to generate the trailer component control signals for the one or more trailer components using the CAN transceiver.

28. The nosebox assembly of claim 27, wherein the CAN communication cables are electrically connected to CAN component control circuits for the trailer components, and wherein the trailer components are mounted to the truck trailer and include any combination of: a running lamp, interior illumination lamp, clearance lamp, backup lamp, license plate lamp, stop lamp, tail lamp, turn lamp, stop-tail-turn lamp, Anti-lock Braking controller, brake pressure sensor, cargo area temperature sensor, door sensor, cargo sensor, humidity sensor, tank level sensor, proximity sensor, tire pressure sensor, refrigeration system temperature sensor, refrigeration system controller, backup camera, or side camera.

29. The nosebox assembly of claim 20, wherein the control circuit further comprises:
   an environmental monitoring circuit responsive to one or more environmental sensors, wherein the control circuit is configured to obtain environmental data from the environmental monitoring circuit and send the environmental data to the remote device,
   wherein the control circuit is configured to send the remote device using the at least one communication link.

30. The nosebox assembly of claim 20, wherein the at least one trailer power terminal includes six separate trailer power cables electrically connected to six separate power cables in the truck trailer, the six separate power cables electrically connected to multiple trailer components in the truck trailer.

31. The nosebox assembly of claim 20, wherein the control circuit further comprises:
   an outage detection circuit responsive to one or more trailer components, wherein the control circuit is configured to determine an outage that occurs when the one or more trailer components has failed, and to send data about the one or more trailer components to the remote device using the at least one communication link.

32. The nosebox assembly of claim 31, wherein the outage detection circuit is configured to monitor changes in voltage between at least two of the trailer terminals to determine an outage.

33. The nosebox assembly of claim 31, wherein the outage detection circuit is configured to monitor an electrical current passing through at least one trailer power terminal to determine an outage.

34. The nosebox assembly of claim 20, wherein a cross section of the housing defines a six-sided polygon.

35. A method of installing a nose box assembly on a truck trailer, comprising:
   electrically connecting at least one trailer power cable of the truck trailer to at least one trailer power terminal of a nose box mount, and at least one trailer ground cable of the truck trailer to at least one trailer ground terminal of the nose box mount, wherein the nose box mount further includes:
      a receptacle ground terminal and at least six separate receptacle power terminals;
      a control circuit having a communication circuit configured to establish at least one communication link with a remote device, the communication link separate from the at least one trailer ground terminal and the at least one trailer power terminal;
      a location finding circuit configured to determine a geographic location of the nose box on the earth, wherein the location finding circuit is configured to triangulate the geographic location using signals from at least one transmitter sending signals received by the location finding circuit,
      wherein the control circuit is configured to send the geographic location to the remote device using the at least one communication link,
      wherein the control circuit is configured to electrically connect the receptacle terminals to the trailer terminals,
      wherein the control circuit is configured to determine a status of one or more trailer components electrically connected to the at least two trailer terminals, and
      wherein the control circuit is configured to use the communication link to send data defining the status of the one or more trailer components;
   electrically connecting the receptacle ground terminal and the at least six separate receptacle power terminals to corresponding ground and power terminals of a receptacle of the nose box assembly,
      wherein the receptacle ground and power terminals are arranged in the receptacle mount to conform to a standard J-560 trailer connection;
   positioning the nose box mount between the truck trailer and the nose box assembly; and fastening the nose box mount and the nose box assembly to the truck trailer.

36. A control circuit assembly adapted to be placed between a truck trailer and a nosebox, the nosebox having an outward facing receptacle to interface with a standard J-560 trailer connection plug and with inward terminals, and the nosebox further having an inward facing footprint, the control circuit assembly comprising:
a base member;
a first seal locatable between the base member and the trailer to at least partially seal against moisture passage therebetween;
a second seal locatable between the base member and the nosebox to at least partially seal against moisture passage therebetween;
a control circuit attached to the base member and comprising a plurality of leads electrically connectable to at least some of the inward terminals of the receptacle to also connect to at least a power and a ground wire of the truck trailer;
a location finding circuit configured to determine a geographic location of the nose box on the earth, wherein the location finding circuit is configured to triangulate the geographic location using signals from at least one transmitter sending signals received by the location finding circuit,
wherein the control circuit is configured to send the geographic location to the remote device using the at least one communication link; and
wherein the control circuit has a communication circuit configured to establish at least one communication link with a remote device, the communication link established separately from the inward terminals interfacing with the J-560 trailer connection plug.

37. The control circuit assembly of claim 36 wherein the plurality of leads is seven separate leads connectable to seven separate terminals of the receptacle.

38. The control circuit assembly of claim 36 wherein the base member defines a peripheral shape corresponding to and larger than the inward facing footprint of the nosebox.

39. The control circuit assembly of claim 36 wherein the base member defines a peripheral shape selected from the group consisting of: (a) generally six-sided, (b) generally circular, (c) generally rectangular, and (d) generally isosceles trapezoidal on at least half of the peripheral shape.

40. The control circuit assembly of claim 36 wherein the base member defines four mounting holes therein to receive four fasteners therethrough for fastening to the trailer.

41. The control circuit assembly of claim 40 and further comprising two outwardly facing fasteners for fastening the base member to the nose box.

42. The control circuit assembly of claim 40 wherein the first seal comprises a gasket defining a central opening and four holes therearound and corresponding in location to the four mounting holes in the base member.

43. The control circuit assembly of claim 42, wherein at least two of the four mounting holes of the baseplate are 4.4 inches apart, and wherein at least two of the four mounting holes are 3.8 inches apart.

44. The control circuit assembly of claim 41, wherein the two outwardly facing fasteners are positioned 4 inches apart.

45. The control circuit assembly of claim 36, wherein the baseplate and the control circuit are formed as a single unitary molded structure.

46. The control circuit assembly of claim 45, wherein the control circuit further comprises:
a communication circuit configured to establish at least one communication link with a remote device,
wherein the control circuit is configured to determine the status of the one or more trailer components electrically connected to at least two of the multiple leads, and
wherein the control circuit is configured to use the communication link to send data defining the status of the one or more trailer components.

47. The control circuit assembly of claim 46, wherein the communication circuit further comprises:
at least one antenna, wherein the communication circuit is configured to send data wirelessly to the remote device using the at least one antenna.

48. The control circuit assembly of claim 46, wherein the at least one communication link includes at least one of the following or any combination thereof:
a Bluetooth wireless communication link that sends the data according to the Bluetooth protocol,
a LoRa communication link that sends the data according to the LoRa protocol,
a communication link that conforms to the Institute of Electrical and Electronics Engineers (IEEE) 802.15.4 specification,
a communication link that conforms to any one or more of the IEEE 802.11 family of wireless protocols,
a cellular telephone communication link.

* * * * *